US006976016B2

(12) United States Patent
Chang et al.

(10) Patent No.: US 6,976,016 B2
(45) Date of Patent: Dec. 13, 2005

(54) MAXIMIZING EXPECTED GENERALIZATION FOR LEARNING COMPLEX QUERY CONCEPTS

(75) Inventors: Edward Y. Chang, Santa Barbara, CA (US); Kwang-Ting Cheng, Santa Barbara, CA (US)

(73) Assignee: Vima Technologies, Inc., Goleta, CA (US)

( * ) Notice: Subject to any disclaimer, the term of this patent is extended or adjusted under 35 U.S.C. 154(b) by 391 days.

(21) Appl. No.: 10/032,319

(22) Filed: Dec. 21, 2001

(65) Prior Publication Data

US 2003/0050923 A1 Mar. 13, 2003

Related U.S. Application Data

(60) Provisional application No. 60/292,820, filed on May 22, 2001, and provisional application No. 60/281,053, filed on Apr. 2, 2001.

(51) Int. Cl.[7] .......... G06F 17/30
(52) U.S. Cl. .......... 707/3
(58) Field of Search .......... 707/3, 5, 7, 102, 707/104.1; 345/810; 348/231; 382/159

(56) References Cited

U.S. PATENT DOCUMENTS

| | | | | |
|---|---|---|---|---|
| 5,636,328 A | | 6/1997 | Kautz et al. | |
| 5,666,528 A | * | 9/1997 | Thai | 707/102 |
| 6,377,945 B1 | * | 4/2002 | Risvik | 707/3 |
| 6,408,293 B1 | * | 6/2002 | Aggarwal et al. | 707/3 |

OTHER PUBLICATIONS

E. Chang, L Beitao, MEGA—The Maximizing Expected Generalization Algorithm for Learning Complex Query Concepts.*

U.S. Appl. No. 60/281,053, filed Apr. 2, 2001, Chang et al.

U.S. Appl. No. 60/324,766, filed Sep. 24, 2001, Chang.

U.S. Appl. No. 60/292,820, filed May 22, 2001, Chang et al.

E. Chang and T. Cheng, "Perception–based image retrieval", ACM Sigmod (Demo), May 2001.

E. Chang, B. Li, "Towards perception–based image retrieval", IEEE, Content–Based Access of Image and Video Librariers, 5 pgs, Jun. 2000.

I. J. Cox, et al., "The Bayesian image retrieval system, Pichunter: Theory, implementation and psychological experiments", IEEE Transaction on Image Processing, 19 pgs. 2000.

R. Fagin, "Fuzzy queries in multimedia database systems", ACM Sigacr–Sigmod–Sigart Symposium on Principles of Database Systems, 22 pgs., 1998.

(Continued)

*Primary Examiner*—Safet Metjahic
*Assistant Examiner*—Etienne P Leroux
(74) *Attorney, Agent, or Firm*—Morrison & Foerster LLP

(57) ABSTRACT

A method of learning user query concept for searching visual images encoded in computer readable storage media comprising: providing a multiplicity of sample images encoded in a computer readable medium; providing a multiplicity of sample expressions that correspond to sample images and in which terms of the sample expressions represent features of corresponding sample images; defining a user query concept sample space bounded by a boundary k-CNF expression and by a boundary k-DNF expression refining the user query concept sample space by, soliciting user feedback as to which of the multiple presented sample images are close to the user's query concept; removing from the boundary k-CNF expression disjunctive terms based upon the solicited user feedback; and removing from the boundary k-DNF expression respective conjunctive terms based upon the solicited user feedback.

24 Claims, 20 Drawing Sheets

OTHER PUBLICATIONS

Figure 1:
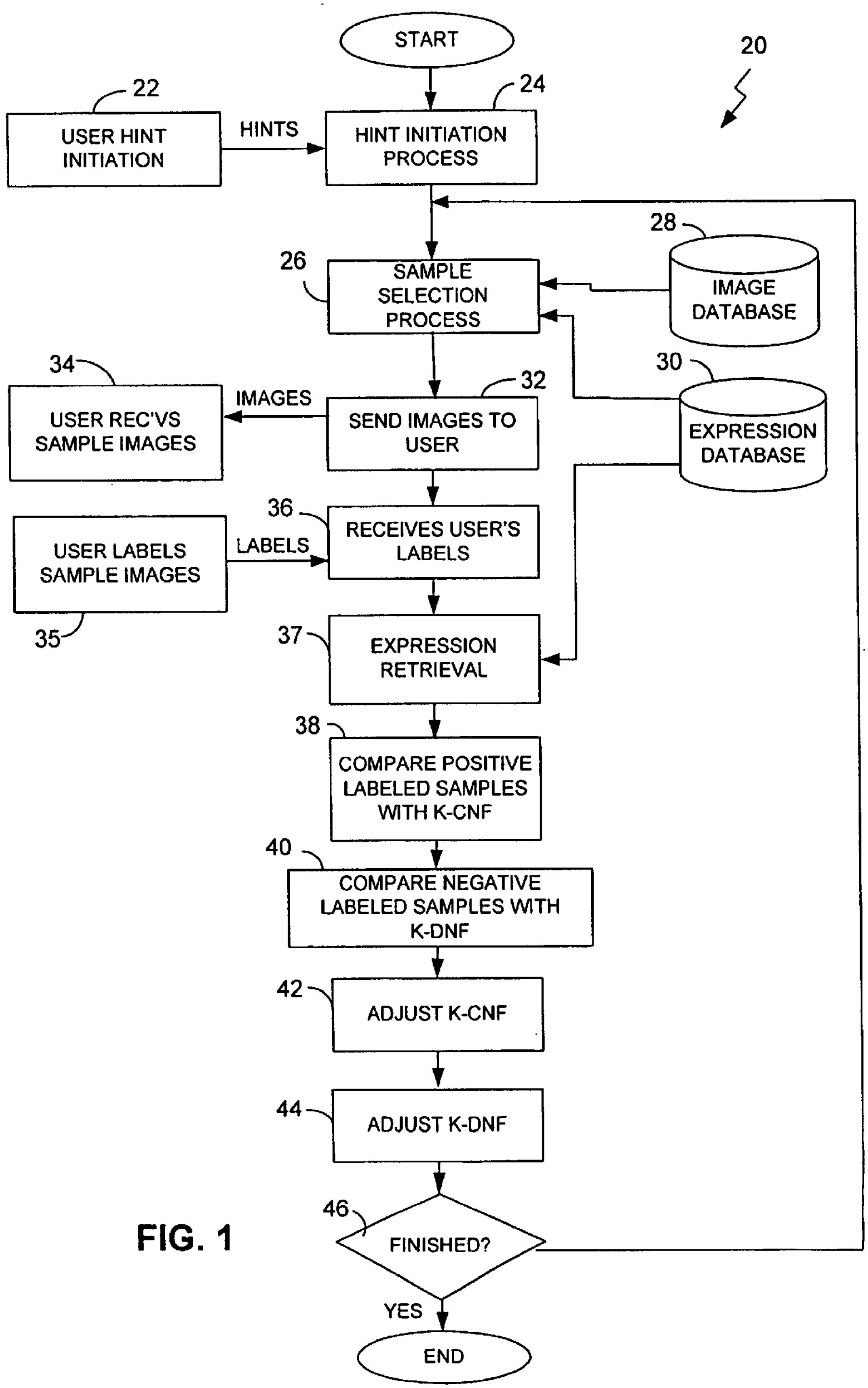

R. Fagin and E. L. Wimmers, "A formula for incorporating weights into scoring rules", International Conference on Database Theory, 28 pgs , 1997.

J. Flusser et al., "On the Calculation of Image Moments".

Y. Freund, et al., "Selective sampling using the query by committee algorithm", Machine Learning, 28:133–168, 1997.

Y. Ishikawa et al., "Mindreader: Querying databases through multiple examples", VLDB, 22 pgs., 1998.

M. Kearns et al., "Learning Boolean formulae", Journal of ACM, 41(6):1298–1328, 1994.

M. Kearns and U. Vazirani, "An Introduction to Computational Learning Theory", MIT Press, 3 pgs.,.

P. Langley and W. Iba, "Average–case analysis of a nearest neighbor algorithm", Proceedings of the 13th International Joint Conference on Artificial Intelligence, (82):889–894, 1993.

P. Langley and S. Sage, "Scaling to domains with many irrelevant features", Computational Learning Theory and Natural Learning Systems, 29 pgs., 1997.

C. Li, et al., "Clustering for approximate similarity queries in high–dimensional spaces", IEEE Transaction on Knowledge and Data Engineering, 41 pgs., 2001.

T. Mitchell, "Machine Learning", McGraw Hill, 1997.

M. Ortega, "Supporting ranked Boolean similarity queries in MARS", IEEE Transaction on Knowledge and Data Engineering, 10(6):905–925, Dec. 1999.

K. Porkaew et al., "Query refinement for multimedia similarity retrieval in MARS", Proceedings of ACM Multimedia, 12 pgs., Nov. 1999.

K. Porkaew et al., "Query reformulation for content based mulitmedia retrieval in MARS", ICMCS, 18 pgs., 1999.

Y. Rui et al., "Image retrieval: Current techniques, promising directions, and open issues", Journal of Visual Communication and Image Representation, 17 pgs., Mar. 1999.

Y. Rui et al., "Relevance feedback: A power tool in interactive content–based image retrieval", IEEE Tran on Circuits and Systems for Video Technology, 8(5), 13 pgs. Sep. 1998.

J. R. Smith et al., "Tools and Techniques for Color Image Retrieval", IS&T/SPIE Proceedings vol. 2670, Stor. & Rev. for Image and Video Databases IV, 1996, 12 pgs.

L. Valiant, "A theory of learnable", Proceedings of the Sixteenth Annual ACM Symposium on Theory of Computing, pp. 436–455, 1984.

L. Wu et al., "Falcon: Feedback adaptive loop for content–based retrieval", The 26th VLDB Conference, 10 pgs., Sep. 2000.

L. A. Zadeh, "Fuzzy sets", Information and Control, pp. 338–353, 1965.

E. Chang et al., "MEGA—The Maximizing Expected Generalization Algorithm for Learning Complex Query Concepts", Technical Report, Nov. 2000, pp. 1–39.

A. Aho et al., "Foundations of Computer Science", Imprint of W. H. Freeman and Co., Computer Science Press 1994, pp. 634–636, 667–670.

T. M. Mitchell, "Machine Learning", The McGraw–Hill Co. series in Computer Science, 1997, pp. 20–51, 213–215.

* cited by examiner

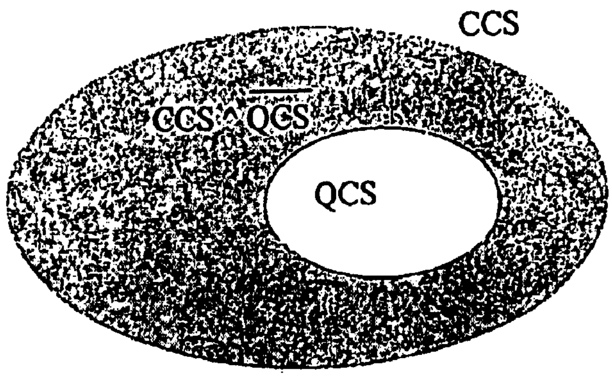
Figure 2: MEGA's Sampling Space: $CCS \wedge \overline{QCS}$.

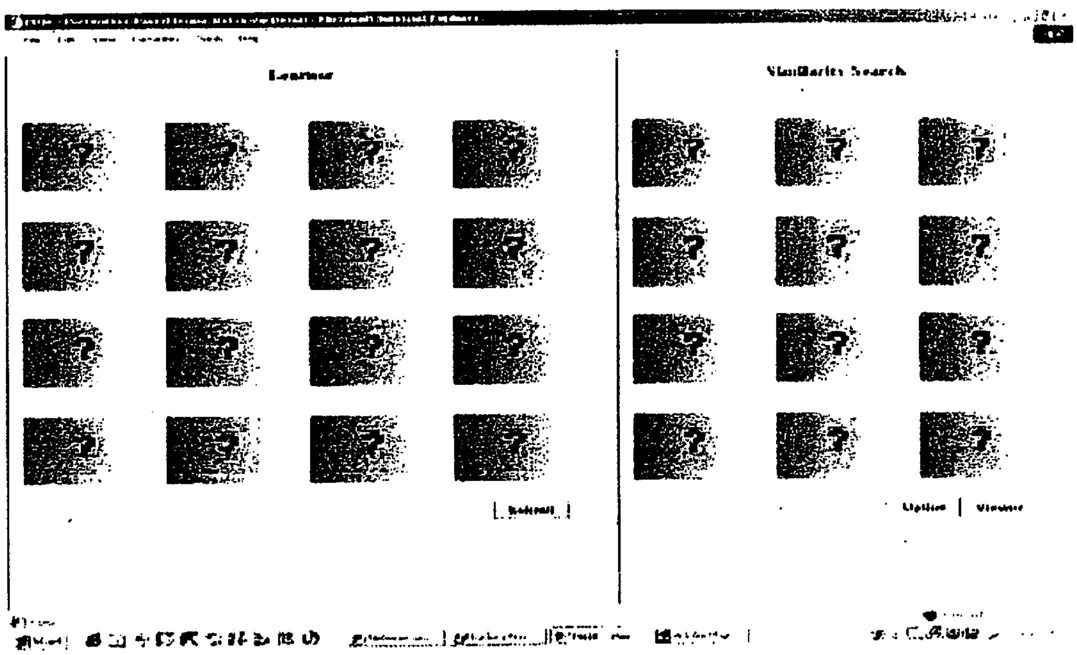
Figure 3: Wild Animal Query Screen #1.

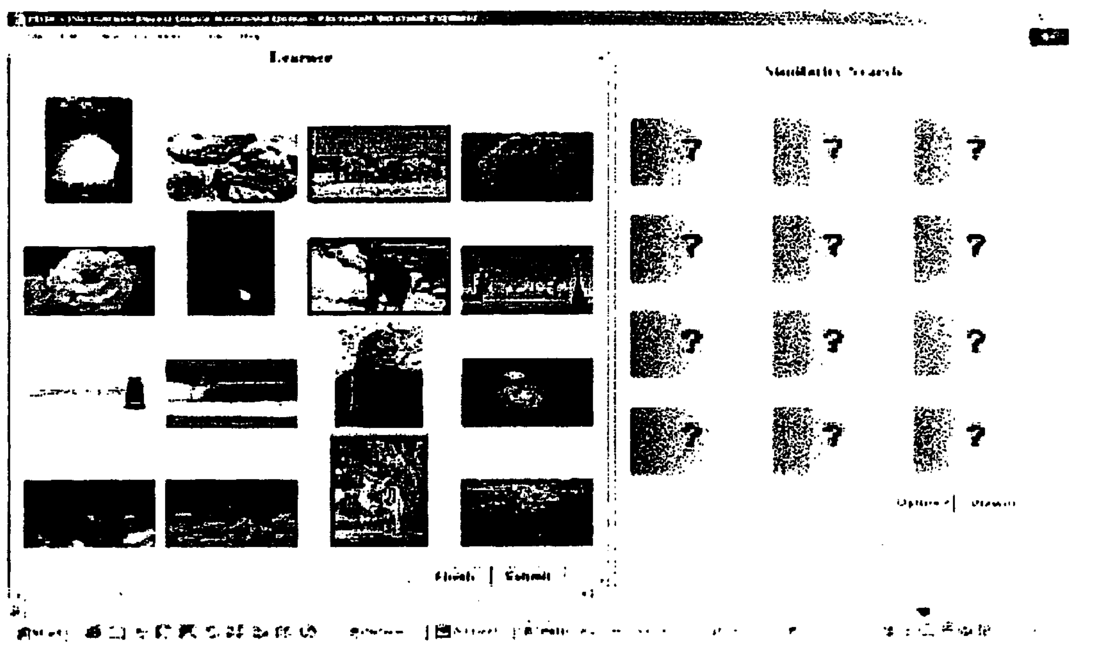
Figure 4: Wild Animal Query Screen #2.

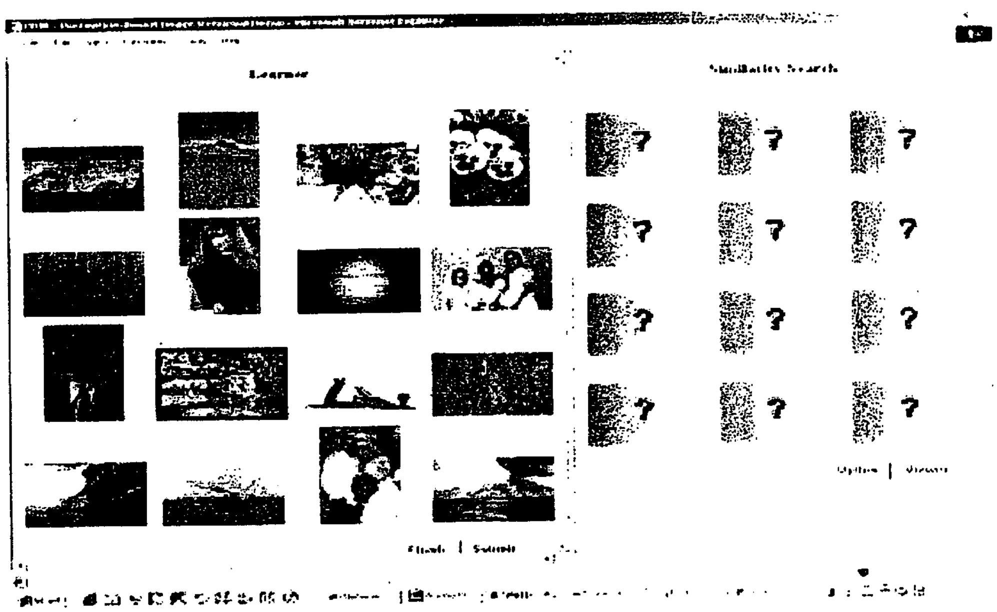
Figure 5: Wild Animal Query Screen #3.

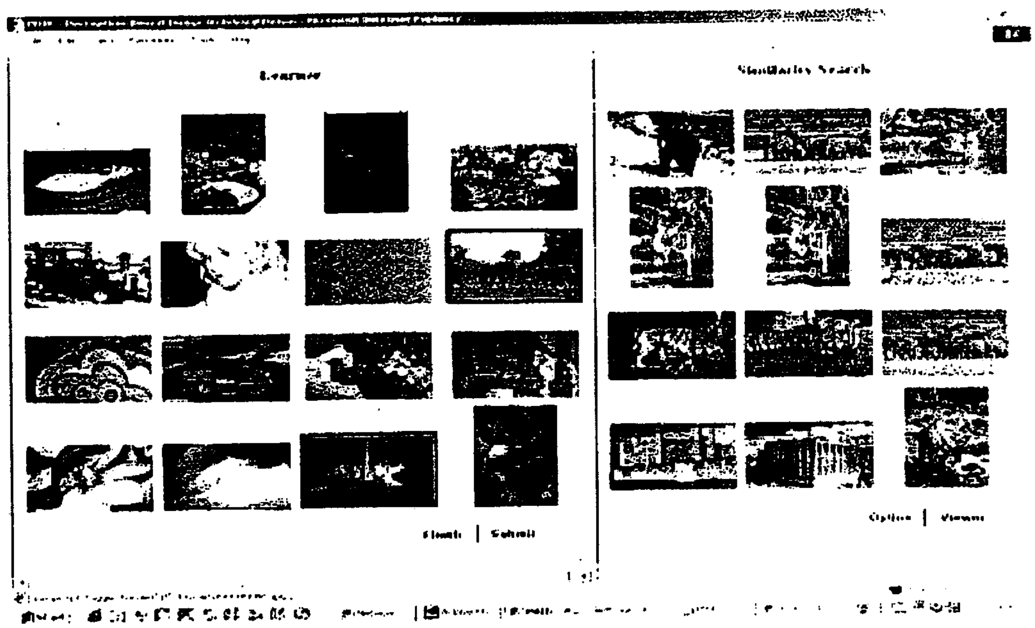
Figure 6: Wild Animal Query Screen #4.

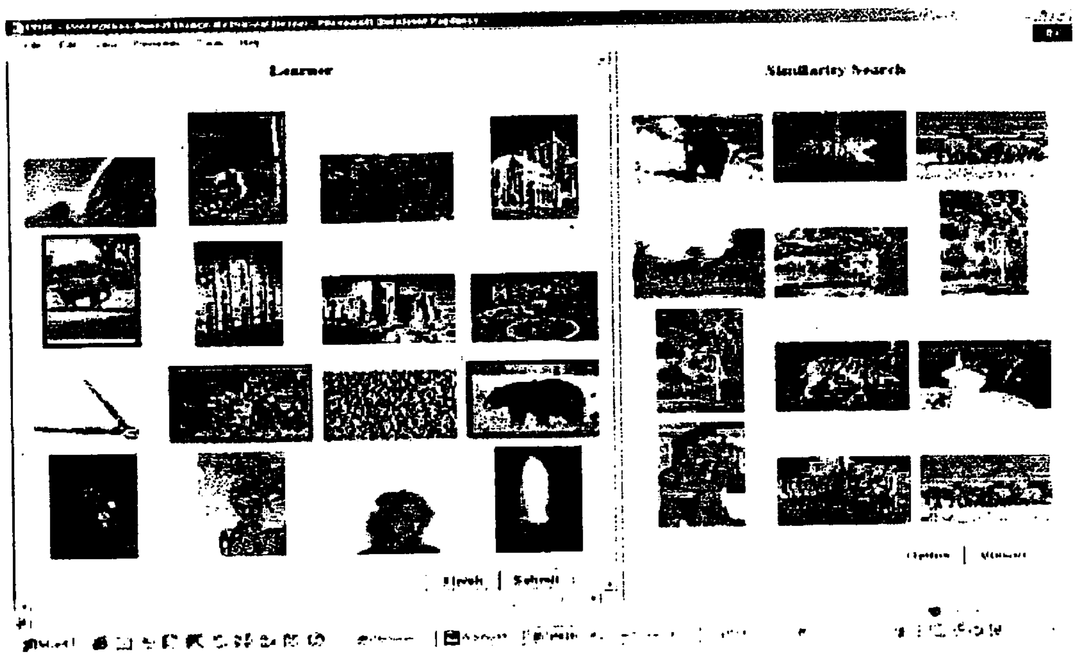
Figure 7: Wild Animal Query Screen #5.

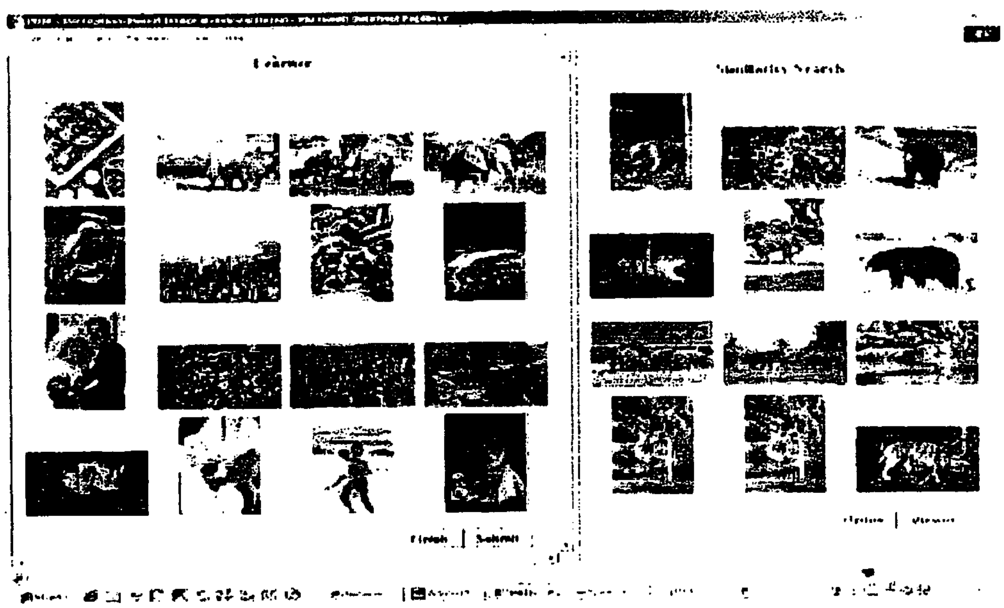
Figure 8: Wild Animal Query Screen #6.

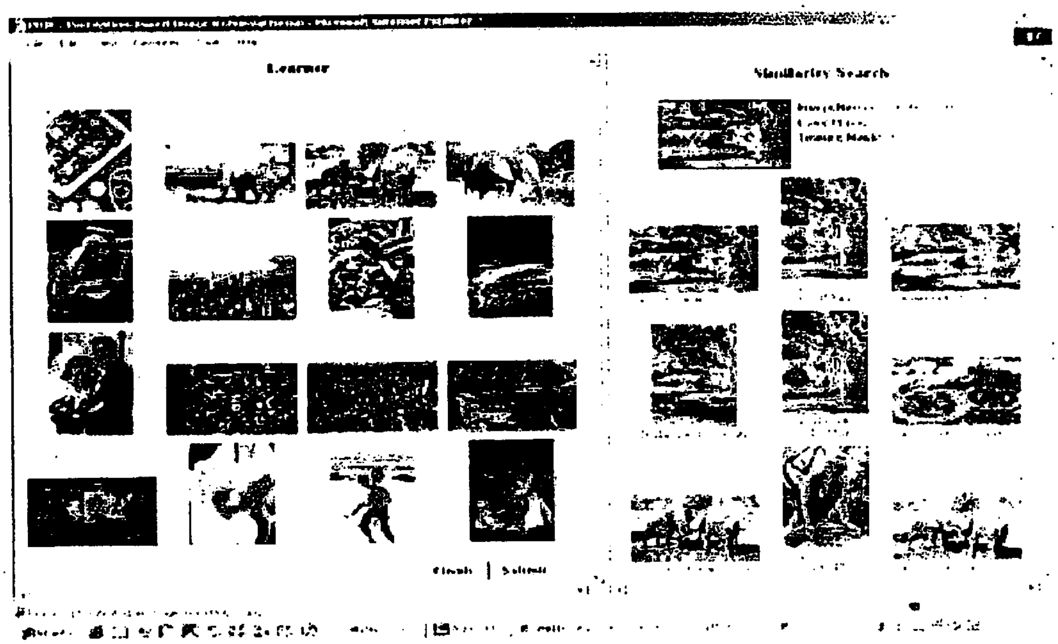
Figure 9: Wild Animal Similarity (Screen #7).

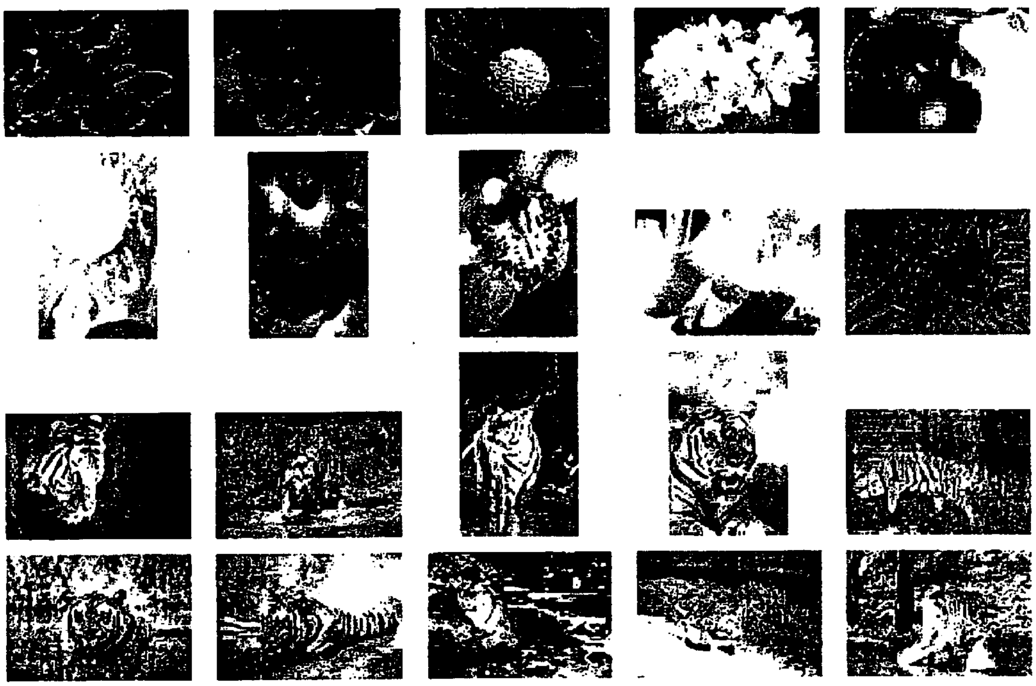
Figure 10: Flowers and Tigers Sample Query Results from SVM $_{Active}$.

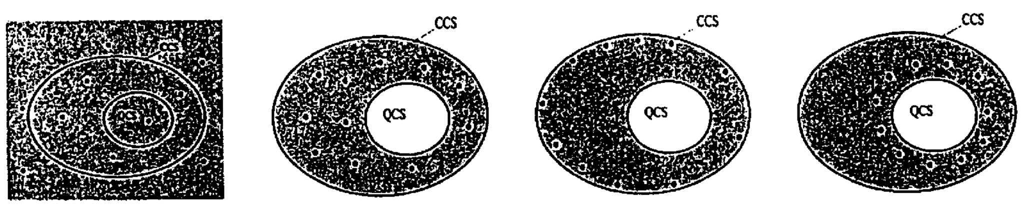
(a) Random (b) B-Random (c) Aggressive (d) MEGA
Figure 11: Sampling Schemes.

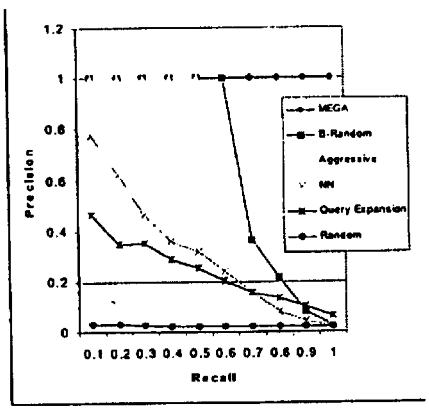
(a) $(P_1 \vee P_2) \wedge P_3$
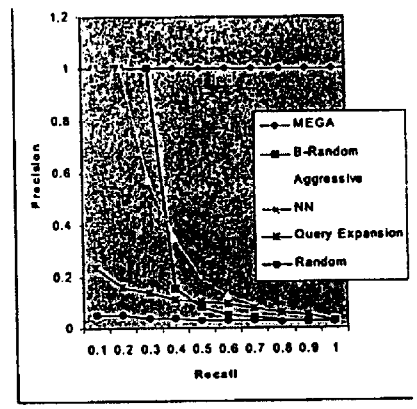
(b) Complex
Figure 12: Precision vs. Recall (10 Features).

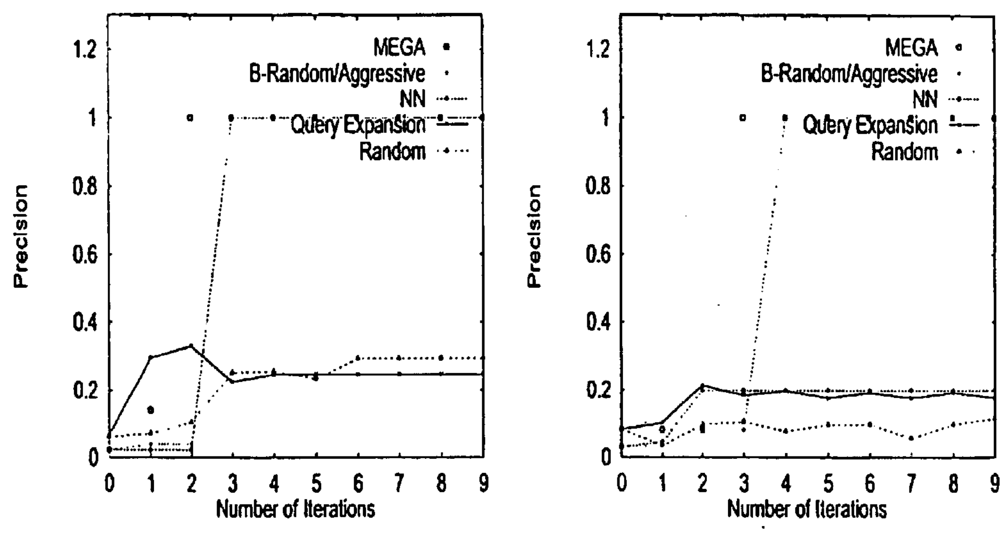
(a) $(P_1 \vee P_2) \wedge P_3$
(b) *Complex Query*
Figure 13: Precision of Six Schemes at Recall = 50%.

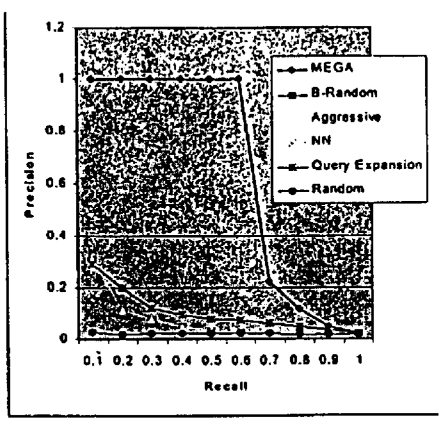
(a) $(P_1 \vee P_2) \wedge P_3$
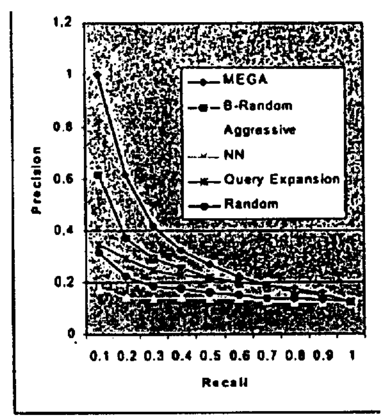
(b) Complex
Figure 14: Precision vs. Recall (20 Features).

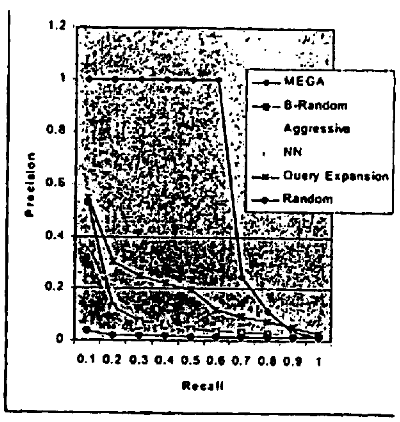
(a) $(P_1 \vee P_2) \wedge P_3$
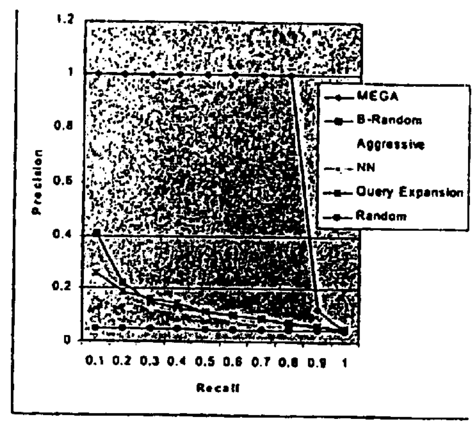
(b) Complex
Figure 15: Precision vs. Recall (30 Features).

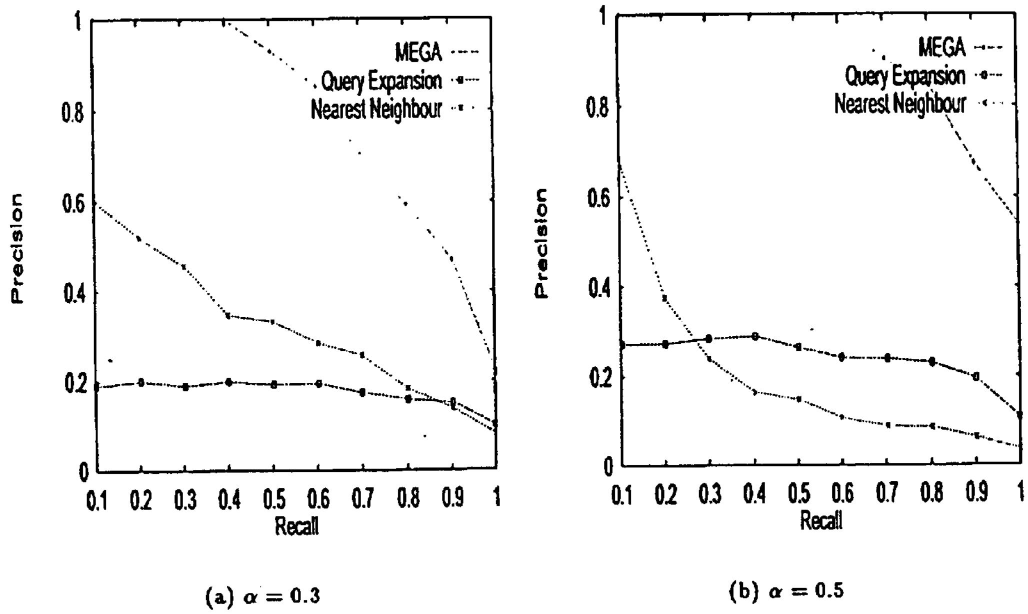
Figure 16: Recall vs. Precision (Model Bias Test).

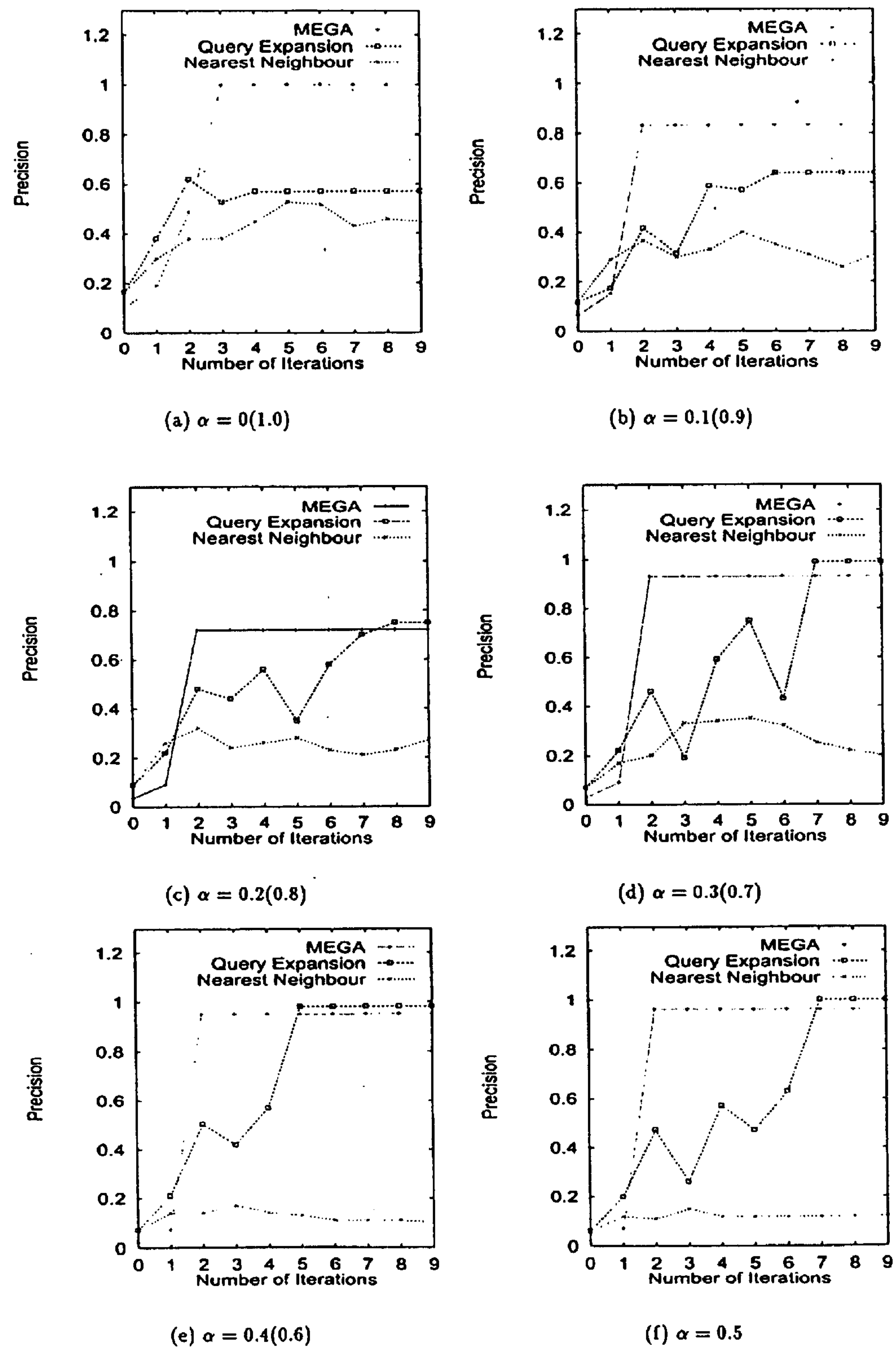
(a) $\alpha = 0(1.0)$
(b) $\alpha = 0.1(0.9)$
(c) $\alpha = 0.2(0.8)$
(d) $\alpha = 0.3(0.7)$
(e) $\alpha = 0.4(0.6)$
(f) $\alpha = 0.5$
Figure 17: The Effect of Different α's.

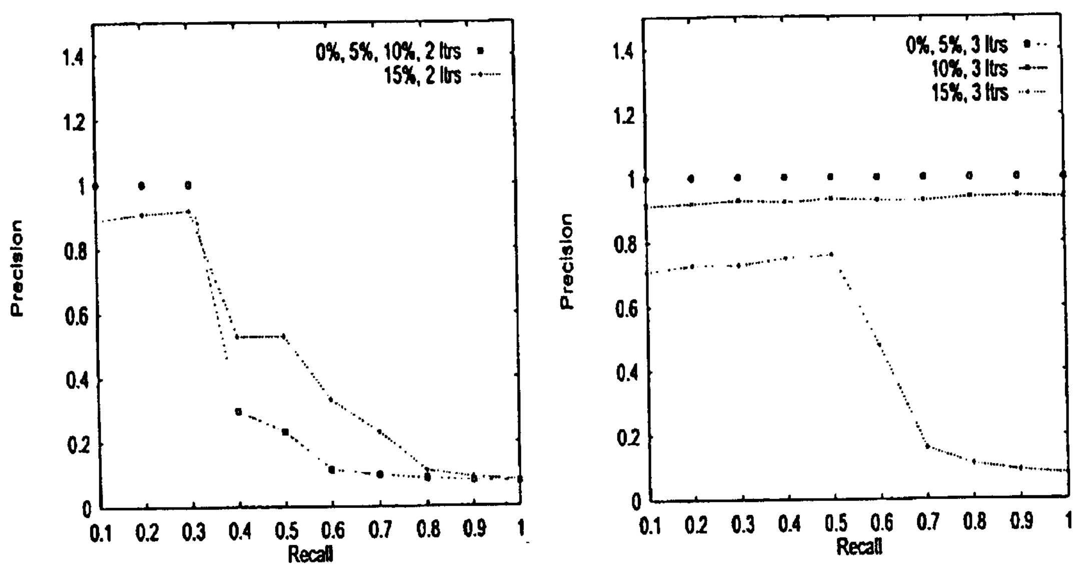
(a) Two Iterations
(b) Three Iterations
Figure 18: Precision/Recall Under 0%, 5%, 10% and 15% Noise.

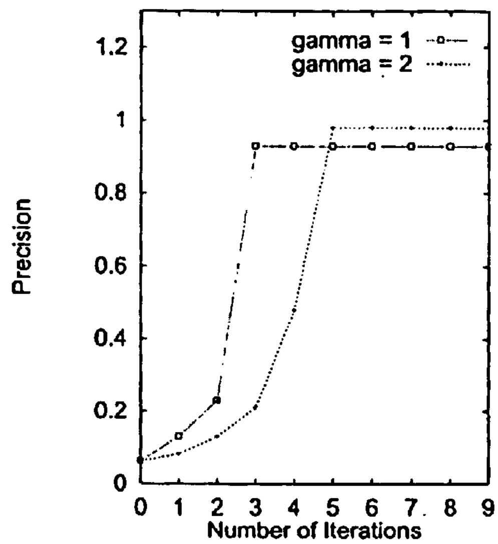
(a) 10%
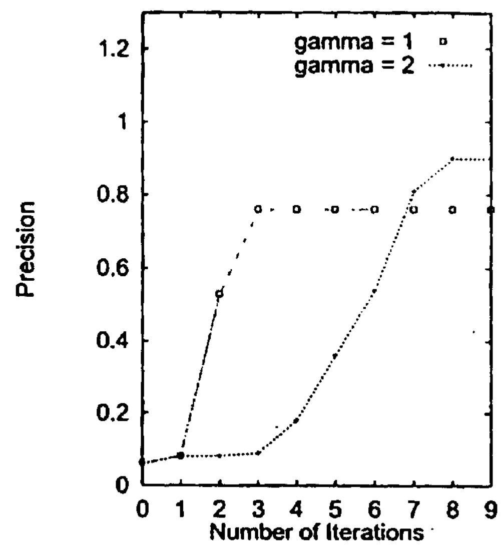
(b) 15%
Figure 19: Effects of Noise.

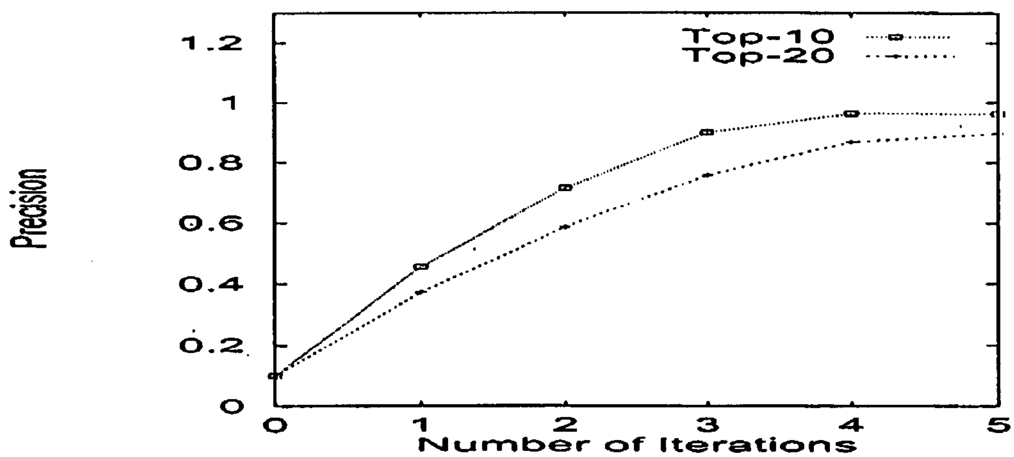
Figure 20: Average Precision of Top-10 and Top-20 Queries.

MAXIMIZING EXPECTED GENERALIZATION FOR LEARNING COMPLEX QUERY CONCEPTS

CROSS-REFERENCE TO RELATED APPLICATION

This application claims the benefit of the filing date of commonly owned provisional patent application Ser. No. 60/292,820, filed May 22, 2001; and also claims the benefit of the filing date of commonly assigned provisional patent application, Ser. No. 60/281,053, filed Apr. 2, 2001.

BACKGROUND OF THE INVENTION

1. Field of the Invention

The invention relates in general to information retrieval and more particularly to query-based information retrieval.

2. Description of the Related Art

A query-concept learning approach can be characterized by the following example: Suppose one is asked, "Are the paintings of Leonardo da Vinci more like those of Peter Paul Rubens or those of Raphael?" One is likely to respond with: "What is the basis for the comparison?" Indeed, without knowing the criteria (i.e., the query concept) by which the comparison is to be made, a database system cannot effectively conduct a search. In short, a query concept is that which the user has in mind as he or she conducts a search. In other words, it is that which the user has in mind that serves as his or her criteria for deciding whether or not a particular object is what the user seeks.

For many search tasks, however, a query concept is difficult to articulate, and articulation can be subjective. For instance, in a multimedia search, it is difficult to describe a desired image using low-level features such as color, shape, and texture (these are widely used features for representing images [17]). Different users may use different combinations of these features to depict the same image. In addition, most users (e.g., Internet users) are not trained to specify simple query criteria using SQL, for instance. In order to take individuals' subjectivity into consideration and to make information access easier, it is both necessary and desirable to build intelligent search engines that can discover (i.e., that can learn) individuals' query concepts quickly and accurately.

REFERENCES

[1] E. Chang and T. Cheng. Perception-based image retrieval. *ACM Sigmod* (Demo), May 2001.

[2] E. Chang, B. Li, and C. L. Towards perception-based image retrieval. *IEEE, Content-Based Access of Image and Video Libraries*, pages 101–105, June 2000.

[3] I. J. Cox, M. L. Miller, T. P. Minka, T. V. Papathomas, and P. N. Yianilos. The Bayesian image retrieval system, Pichunter: Theory, implementation and psychological experiments. *IEEE Transaction on Image Processing* (to appear), 2000.

[4] R. Fagin. Fuzzy queries in multimedia database systems. *ACM Sigacr-Sigmod-Sigart Symposium on Principles of Database Systems,* 1998.

[5] R. Fagin and E. L. Wimmers. A formula for incorporating weights into scoring rules. *International Conference on Database Theory*, pages 247–261, 1997.

[6] Y. Freund, H. S. Seung, E. Shamir, and N. Tishby. Selective sampling using the query by committee algorithm. *Machine Learning,* 28:133–168, 1997.

[7] Y. Ishikawa, R. Subramanya, and C. Faloutsos. Mindreader: Querying databases through multiple examples. *VLDB,* 1998.

[8] M. Kearns, M. Li, and L. Valiant. Learning Boolean formulae. *Journal of ACM,* 41(6):1298–1328, 1994.

[9] M. Kearns and U. Vazirani. *An Introduction to Computational Learning Theory*. MIT Press, 1994.

[10] P. Langley and W. Iba. Average-case analysis of a nearest neighbor algorithm. *Proceedings of the 13th International Joint Conference on Artificial Intelligence*, (82):889–894, 1993.

[11] P. Langley and S. Sage. Scaling to domains with many irrelevant features. *Computational Learning Theory and Natural Learning Systems,* 4, 1997.

[12] C. Li, E. Chang, H. Garcia-Molina, and G. Wiederhold. Clustering for approximate similarity queries in high-dimensional spaces. *IEEE Transaction on Knowledge and Data Engineering* (to appear), 2001.

[13] T. Michell. *Machine Learning*. McGraw Hill, 1997.

[14] M. Ortega, Y. Rui, K. Chakrabarti, A. Warshavsky, S. Mehrotra, and T. S. Huang. Supporting ranked Boolean similarity queries in mars. *IEEE Transaction on Knowledge and Data Engineering,* 10(6):905–925, December 1999.

[15] K. Porkaew, K. Chakrabarti, and S. Mehrotra. Query refinement for multimedia similarity retrieval in mars. *Proceedings of ACM Multimedia*, November 1999.

[16] K. Porkaew, S. Mehrota, and M. Ortega. Query reformulation for content based multimedia retrieval in mars. *ICMCS*, pages 747–751, 1999.

[17] Y. Rui, T. S. Huang, and S.-F. Chang. Image retrieval: Current techniques, promising directions, and open issues. *Journal of Visual Communication and Image Representation*, March 1999.

[18] Y. Rui, T. S. Huang, M. Ortega, and S. Mehrotra. Relevance feedback: A power tool in interactive content-based image retrieval. *IEEE Tran on Circuits and Systems for Video Technology,* 8(5), September 1998.

[19] L. Valiant. A theory of learnable. *Proceedings of the Sixteenth Annual ACM Symposium on Theory of Computing*, pages 436–445, 1984.

[20] L. Wu, C. Faloutsos, K. Sycara, and T. R. Payne. Falcon: Feedback adaptive loop for content-based retrieval. *The 26th VLDB Conference*, September 2000.

[21] L. A. Zadeh. Fuzzy sets. *Information and Control*, pages 338–353, 1965.

DETAILED DESCRIPTION OF THE PREFERRED EMBODIMENTS

Introduction

To learn users' query concepts, the present invention provides a query-concept learner process and a computer software based apparatus that "learns" a concept through an intelligent sampling process. The query-concept learner process fulfills two primary goals. By "learns," it is meant that the query-concept learner process evaluates user feedback as to the relevance of samples presented to the user in order to select from a database samples that are very likely to match, or at least come very close to matching, a user's current query concept. One, the concept-learner's hypothesis space must not be too restrictive, so it can model most practical query concepts. Two, the concept-learner should grasp a concept quickly and with a small number of labeled instances, since most users do not wait around to provide a great deal of feedback. To fulfill these design goals, the present invention uses a query-concept learner process that we refer to as, the *Maximizing Expected Generalization Algorithm* (MEGA). MEGA models query concepts in k-CNF [8], which can model almost all practical query concepts. k-CNF is more expressive than k-DNF, and it has both polynomial sample complexity and time complexity [9, 13]. To ensure that target concepts can be learned quickly and with a small number of samples, MEGA employs two sub-processes: (1) a sample selection (S-step); and (2) a feature reduction (F-step) process. In its S-step, MEGA judiciously selects samples that aimed at collecting maximum information from users to remove irrelevant features in its subsequent F-step. In its F-step, MEGA seeks to remove irrelevant terms from the query-concept (i.e., a k-CNF), and at the same time, refines the sampling boundary (i.e., a k-DNF) so that most informative samples can be selected in its subsequent S-step. MEGA is a recursive. The two-step process (S-step followed by F-step) repeats, each time with a smaller sample space and a smaller set of features, until the user query concept has been identified adequately. Unlike traditional query refinement methods, which uses only the S-step or only the F-step (Section 5 highlights related work), MEGA uses these two steps in a complementary way to achieve fast convergence to target concepts.

In a present embodiment, in order to evaluate a user query concept efficiently, the MEGA query-concept learner process uses a multi-resolution/hierarchical learning method. Features are divided into subgroups of different resolutions. As explained more fully below, the query-concept learner process exploits the multi-resolution/hierarchical structure of the resolution hierarchy to reduce learning space and time complexity. It is believed that when features are divided carefully into G groups, MEGA can achieve a speedup of $O(G^{k-1})$ with little precision loss.

Overview of Operation of the User Query-Concept Learner Process

Referring to the illustrative drawing of FIG. X, there is shown a generalized flow diagram which illustrates the overall flow of a user query-concept learner process in accordance with a present embodiment of the invention. Typically, a user initiates the process by providing hints about his or her current query-concept. The objective is to use these hints to bootstrap the overall learner process by providing an initial set of positive samples that match the user's query-concept and an initial set of negative samples that do not match the user's query-concept. This software-based initialization process may involve a transfer of hints from a user computer to a software-based initialization process running on another computer that evaluates the hints in order to generate an initial set of samples. The user indicates which ,if any, samples meet the user's query-concept.

Once the process has been initialized, a software-based sample selection process selects samples for presentation to the user. The sample images are selected from a query-concept sample space demarcated by a QCS, modeled as a k-CNF, and a CCS, modeled as a k-DNF. As explained in the sections below, sample images correspond to expressions that represent the features of the images. The expressions are stored in an expression database. The sample selection process evaluates these expressions in view of the QCS and the CCS in order to determine which sample images to present to the user. The sample images are carefully selected in order to garner the maximum information from the user about the user's query concept. As explained below, a sample generally should be selected that is sufficiently close to the QCS so that the user is likely to label the sample as positive. Conversely, the sample generally should be selected that is sufficiently different from the QCS so that a positive labeling of the sample can serve as an indicator of what features are irrelevant to the user's query-concept.

A software-based delivery process delivers the selected sample images to the user for viewing and feedback. The user views the sample images on his or her visual display device, such as a computer display screen, and labels the sample images so as to indicate which sample images match the user's query-concept (positive label) and which do not (negative label). Note that the user's labeling may be implicit. For instance, in one embodiment, samples that are not explicitly labeled as positive are implicitly presumed to have been labeled as negative. In other embodiments, the user may be required to explicitly label samples as positive and negative, and no implication is drawn from a failure to label.

Next, the user's labels are communicated to a software-based process which receives the label information and forwards the label information to a software-based process that retrieves from the expression database, expressions that correspond to the labeled samples. A software-based comparison process compares the expressions for the positive labeled samples with the k-CNF to determine whether there are disjunctive terms of the k-CNF that are candidates for removal based upon differences between the k-CNF and the positive labeled samples. A software-based comparison process compares the negative labeled samples with the k-DNF to determine whether there are conjunctive terms of the k-DNF that are candidates for removal based upon differences between the k-DNF and the negative labeled samples. A software-based adjustment process adjusts the k-CNF by removal of disjunctive terms that meet a prescribed measure of difference from the positive labeled samples. A software-based adjustment process adjusts the k-DNF by removal of conjunctive terms that meet a prescribed measure of difference from the negative labeled samples.

Finally, a software-based 'finished-yet process?'0 determines whether the QCS and the CCS have converged or collapsed such that the overall query-concept learner process is finished. If the overall process is not finished then the 'finished-yet?' process returns control to the software-based sample selection process. The overall process, therefore, runs recursively until the adjustment of the QCS, through changes in the k-CNF, and the adjustment of the CCS, through changes in the k-DNF, result in a collapsing or convergence of these two spaces, either of which extinguishes the query concept sample space from which samples are selected.

1.1 A Simple Motivating Example

The following is a relatively simple hypothetical example that illustrates the need for a query-concept learner process and associated computer program based apparatus in accordance with the invention. This simple example is used throughout this specification to explain various aspects of our process and to contrast the process with others. This hypothetical example has a relatively simple feature set, and therefore, is useful for explaining in more simple terms certain aspects of the learner process. Although the learner process is being introduced through a simple example, it will be appreciated that the learner process is applicable to resolve query concepts involving complex feature sets. More specifically, in Section 4, the MEGA query-concept learner is shown to work well to learn complex query concepts for a high dimensional image dataset.

Suppose Jane plans to apply to a graduate school. Before filling out the forms and paying the application fees, she would like to estimate her chances of being admitted. Since she does not know the admission criteria, she decides to learn the admission concept by induction. She calls up a few friends who applied last year and obtains the information shown in Table 1.

TABLE 1

Admission Samples.

| Name | GPA | GRE | Has Publications? | Is Athletic? | Was Admitted? |
|---|---|---|---|---|---|
| Joe | high | high | false | true | true |
| Mary | high | low | true | false | true |
| Emily | high | low | true | true | true |
| Lulu | high | high | true | true | true |
| Anna | low | low | true | false | false |
| Peter | low | high | false | false | false |
| Mike | high | low | false | false | false |
| Pica | low | low | false | false | false |

If we look at the GRE scores in the table, we see that students with either high or low GRE scores were admitted, also both kinds were rejected. Hence, we may conclude that the GRE is irrelevant in the admission process. Likewise, one's publication record does not affect admission acceptance, nor does having a high GPA. It may appear that the admission decision is entirely random. However, the graduate school actually uses a combination of reasonable criteria: it requires a high GPA and either a high GRE or publications. In other words, Admission: GPA=high $\wedge$ (GRE=high $\vee$ Publications=true).

Two obvious questions arise: "Are all the samples in Table 1 equally useful for learning the target concept?" and, "Are all features in the table relevant to the learning task?"

Are all samples equally useful? Apparently not, for several reasons. First, it seems that Pica's record may not be useful since she was unlikely to be admitted (i.e., her record is unlikely to be labeled positive). Second, both Emily and Mary have the same record, so one of these two records is redundant. Third, Lulu's record is perfect and hence does not provide additional insight for learning the admission criteria. This example indicates that choosing samples randomly may not produce useful information for learning a target concept.

Are all features relevant? To determine relevancy, we examine the features in the table. The feature "Is athletic?" does not seem to be relevant to graduate admissions. The presence of irrelevant features can slow down concept learning exponentially [10, 11].

This example may seem very different from, say, an image search scenario, where a user queries similar images by example(s). But if we treat the admission officer as the user who knows what he/she likes and who can, accordingly, label a data as true or false, and if we treat Jane as the search engine who tries to find out what the admission officer thinks, then it is evident that this example represents a typical search scenario.

The following sections show how and why a query-concept learner process in accordance with the present invention can quickly learn a target concept like the example of admission criteria whereas other methods may not. It will also be shown that a concept learner in accordance with a present embodiment can tolerate noise, i.e., it works well even when a target concept is not in k-CNF and even when training data contain some errors. In addition, it will be shown that a multi-resolution/hierarchical learning approach in accordance with one embodiment of the invention can drastically reduce learning time and make the new query-concept learner effective when it "learns" a concept in very high dimensional spaces.

1.2 Definitions and Notations

A query-concept learner in accordance with a present embodiment of the invention models query concepts in k-CNF and uses k-DNF to guide the sampling process.

Definition 1: k-CNF: For constant k, the representation class k-CNF consists of Boolean formulae of the form $c_1 \wedge \ldots \wedge c_\theta$, where each $c_i$ is a disjunction of at most k literals over the Boolean variables $x_1, \ldots, x_n$. No prior bound is placed on $\theta$.

Definition 2: k-DNF: For constant k, the representation class k-DNF consists of Boolean formulae of the form $d_1 \vee \ldots \vee d_\theta$, where each $d_i$ is a conjunction of at most k literals over the Boolean variables $x_1, \ldots, x_n$. No prior bound is placed on $\theta$.

In a retrieval system in accordance with a present embodiment of the invention, queries are Boolean expressions consisting of predicates connected by the Boolean operators $\vee$ (or) and $\wedge$ (and). A predicate on attribute $x_k$ in a present system is in the form of $P_{x_k}$. A database system comprises a number of predicates. The approach to identifying a user's query-concept in accordance with the present inventor is to find the proper operators to combine individual predicates to represent the user's query concept. In particular, a k-CNF format is used to model query concepts, since it can express most practical queries and can be learned via positive-labeled samples in polynomial time [8, 13]. In addition, in a present embodiment of the invention, non-positive-labeled samples are used to refine a sampling space, which we will discuss in detail in Section 2.

A k-CNF possesses the following three characteristics:

1: The terms (or literals) are combined by the $\wedge$ (and) operator.

2: The predicates in a term are combined by the $\vee$ (or) operator.

3: A term can have at most k predicates.

Suppose we have three predicates $P_{x_1}$, $P_{x_2}$, and $P_{x_3}$. The 2-CNF of these predicates is $$P_{x_1} \wedge P_{x_2} \wedge P_{x_3} \wedge (P_{x_1} \vee P_{x_2}) \wedge (P_{x_1} \vee P_{x_3}) \wedge (P_{x_2} \vee P_{x_3}).$$

To find objects that are similar to a k-CNF concept, similarity between objects and the concept is measured. Similarity is first measured at the predicate level and then at the object level. At the predicate level, we let $F_{x_k}(i,\beta)$ be the distance function that measures the similarity between object i and concept $\beta$ with respect to attribute $x_k$. The similarity score $F_{x_k}(i, \beta)$ can be normalized by defining it to be between zero and one. Let $P_{x_k}(i, \beta)=0$ denote the normalized form. $P_{x_k}(i, \beta)=0$ means that object i and concept $\beta$ have no similarity with respect to attribute $x_k$, and $P_{x_k}(i, \beta)=1$ means that the objects with respect to $x_k$ are the same.

Suppose a dataset contains N objects, denoted as $O_i$, where i=1 . . . N. Suppose each object can be depicted by M attributes, each of which is denoted by $x_k$, where k=1 . . . M. At the object level, standard fuzzy rules, as defined by Zadeh [4, 21], can be used to aggregate individual predicates' similarity scores. An M-tree aggregation function that maps $[0, 1]^M$ to [0, 1] can be used to combine M similarity scores into one aggregated score. The rules are as follows:

Conjunctive rule: $P_{x_1 \wedge x_2 \wedge \ldots \wedge x_M}(i, \beta)=\min\{P_{x_1}(i, \beta), P_{x_2}(i, \beta), \ldots P_{x_M}(i, \beta)\}$.

Disjunctive rule: $P_{x_1 \vee x_2 \vee \ldots \vee x_M}(i, \beta)=\max\{P_{x_1}(i, \beta), P_{x_2}(i, \beta, \ldots P_{x_M}(i, \beta)\}$.

To assist the reader, Table 2 summarizes the parameters that have been introduced and that will be discussed in this document.

TABLE 2

Parameters.

| Parameter | Description |
|---|---|
| U | Unlabeled dataset |
| M | The number of attributes for depicting a data object |
| N | The number of data objects in U |
| u | A set of samples selected from the unlabeled set U |
| $\chi_i$ | The $i^{th}$ attribute |
| $O_j$ | The $j^{th}$ object |
| $Y_j$ | The label of the $j^{th}$ object |
| y | The labeled set u |
| $y^+$ | The positive-labeled set |
| $y^-$ | The negative-labeled set |
| QCS | The set representation of the query concept space in k-CNF |
| CCS | The set representation of the candidate concept space in k-DNF |
| $d_i$ | The $i^{th}$ disjunctive term in QCS |
| $c_i$ | The $i^{th}$ conjunctive term in CCS |
| $t_i$ | $d_i$ or $c_I$ |
| $F_{X_k}$ (i,β) | Distance measure between $O_1$, and QCS with respect to $\chi_k$ |
| $P_{x_k}$ (i,β) | Normalized $F_{x_k}$ (i,β) |
| $P_{t_k}$ (i,β) | Normalized $F_{t_k}$ (i,β) |
| $P_{t_i\|y_j}$ | The probability of removing term $t_i$ given $y_j$ |
| $P_{t_i\|y}$ | The probability of removing term $t_i$ given y |
| Kα | Sample size |
| $K_c$ | The threshold of eliminating a conjunctive term, $c_i$ |
| $K_d$ | The threshold of eliminating a disjunctive term, $d_i$ |
| γ | Voting parameter |
| $f()$ | Func. computing the prob. of removing term $t_i$ given $y_j$ |
| Vote( ) | Func. computing the aggregated probability of removing $t_i$ |
| Sample( ) | Sampling func., which selects u from U |
| Feedback( ) | Labeling function |
| Collapsed?( ) | The version space has collapsed? true or false |
| Converged?( ) | The version space has converged? true or false |

2 The MEGA User Query-Concept Learner Process

This section describes how a user query-concept learner process in accordance with a present embodiment of the invention operates. Section 3 discusses how a process in accordance with a present embodiment deals with very large database issues such as high dimensional data and very large datasets.

The query-concept learning process includes the following parts:

Initialization: Provide users with a reasonable way to convey initial hints to the system.

Refinement: Refine the query concept based on positive-labeled instances. The refinement step is carefully designed to tolerate noisy data.

Sampling: Refine the sampling space based on negative-labeled instances and select samples judiciously for expediting the learning process.

2.1 Initialization

In order to more efficiently initiate the process of learning a query concept, a user may engage in a preliminary initialization process aimed at identifying an efficacious, sensible, and reasonable starting point for the concept learner process. The objective of this initialization process is to garner a collection of sample images to be presented to the user to elicit a user's initial input as to which of the initial sample images matches a user's current query concept. It will be appreciated that there may be a very large database of sample images available for presentation to the user. The question addressed by the initialization process is, "Where to start the concept learner process?"

As explained below, the concept learner process according to the present invention proceeds based upon the user's indication of which images match, or at least are close to, the user's current query concept and which do not match, or at least are not close to the user's current query concept. The initialization process aims to identify an initial set of sample images that are likely to elicit a response from the user that identifies at least some of the initial sample images as matching or at least being close to the user's query concept and that identifies other of the initial sample images as not matching or at least not being close to the user's query concept. Thus, the initialization process aims to start the concept learner process with at least some sample images that match the user's query concept and some that do not match the user's query concept.

As part of the initialization process, the user is requested to provide some indication of what he or she is looking for. This request, for example, may be made by asking the user to participate in a key word search or by requesting the user to choose from a number of different categories. The manner in which this initial indication is elicited from the user is not important provided that it does not frustrate the user by taking too long or being too difficult and provided that it results in an initial set of samples in which some are likely to match the user's current query concept and some are not. It is possible that in some cases, more than one initial set of samples will be presented to the user before there are both initial samples that match the user's query concept and samples that do not match.

It will be appreciated that the initialization step is not critical to the practice of the invention. It is possible to launch immediately into the concept learner process without first identifying some samples that do and some samples that do not match the user's current query concept. However, it is believed that the initialization process will accelerate the concept learner process by providing a more effective starting point.

More specifically, a user who cannot specify his/her query concept precisely can initially give the concept learner process some hints to start the learning process. For instance, a search for a document or for an image can start with a key word search or by selecting one or a few categories. It is believed that this bootstrapping initialization process is more practical than that of most traditional multimedia search engines, which make the unrealistic assumption that users can provide "perfect" examples (i.e., samples) to perform a query. A present embodiment of bootstrapping initialization process aims to present a set of samples to the user. The user then labels as positive a set of objects that match the user's query concept. Samples that do not match the user's query concept and that are not labeled as positive are considered to be a negative-labeled set. This initialization process, therefore, bootstraps the concept learner process by providing an initial positive-labeled set and an initial negative-labeled set.

2.2 Refinement

Valiant's learning algorithm [19] is used as the starting point to refine a k-CNF concept. We extend the algorithm to:

1. Handle the fuzzy membership functions (Section 1.2),
2. Select samples judiciously to expedite the learning process (Section 2.3), and
3. Tolerate user errors (Section 2.6).

More specifically, the query-concept learner process initializes a query concept space (QCS) as a k-CNF and a candidate concept space (CCS) as a k-DNF. The QCS starts as the most specific concept and the CCS as the most general concept. The target concept that query-concept learner process learns is more general than the initial QCS and more specific than the initial CCS. The query-concept learner process seeks to learn the QCS, while at the same time refining the CCS to delimit the boundary of the sampling space. (The shaded area in FIG. 1 shows the sampling space between the QCS and the CCS).

the logical flow of the MEGA query-concept learner process is set forth below in general terms.

Definition 3: Converged? (QCS, CCS)

Converged? (QCS, CCS)←true if CCS==QCS; false otherwise.

Definition 4: Collapsed? (QCS, CCS)

Collapsed? (QCS, CCS)←true if CCS, QCS; false otherwise.

Algorithm MEGA
Input: U, $K_c$, $K_d$, $K_\alpha$;
Output: QCS;
Procedure calls: ƒ( ), Vote( ), Sample( ), Feedback( ), Collapsed?( ), Converged?( );
Variables: u, y, U, $P_{x_k}$ (i,β), $P_{t_k}$ (i,β);
Begin
1 Initialize the version space
  QCS←{$d_1$, $d_2$, . . . }; CCS←{$c_1$, $c_2$ . . . };
2 Refine query concept via relevance feedback
  While (not Collapsed? (QCS, CCS) and not Converged? (QCS, CCS))
2.a S-step: sample selection
  u←Sample(QCS, CCS, U, $K_\alpha$,);
2.b Solicit user feedback
  For each $u_i \in$ u
  $y_i$←Feedback($u_i$);
2.c F-step: feature reduction
2.c.1 Refine k-CNF using positive samples
  For each $d_i \in$ QCS
  For each $y_j \in y^+$
  $P_{d_i|y_j}$←ƒ($d_i$, $O_j$, QCS);
  $P_{d_i|y^+}$←Vote($y^+$, $P_{d_i|y_j \in y^+}$, γ)
  If ($P_{d_i|y^+}$>$K_d$)
  QCS←QCS−{$d_j$};
2.c.2 Refine k-DNF using negative samples
  For each $c_i \in$ CCS
  For each $y_j \in y^-$
  $P_{c_i|y_j}$←ƒ($c_i$, $O_j$, CCS);
  $P_{c_i|y^-}$←Vote($y^-$, $P_{c_i 51\ y_j \in y^-}$, γ);
  If ($P_{c_i|y^-}$>$K_c$)
  CCS−CCS−ƒ{$c_j$};
2.d Bookkeeping
  U←U−u;
3 Return query concept
  Output QCS;
End FIG. 2: Algorithm MEGA Step 2.a: This is the sample selection process. The sample process selects samples from the unlabeled pool U. The unlabeled pool contains samples that have not yet been labeled as matching or not matching the current user query-concept. This step passes QCS, CCS, and U to procedure Sample to generate $K_\alpha$ samples. In the present embodiment of the invention QCS is modeled as a k-DNF, and CCS is modeled as a k-DNF. Therefore, the k-CNF and k-DNF are passed to procedure sample. The procedure Sample is discussed in Section 2.3.

Step 2.b: This process solicits user feedback. A user marks an object positive if the object fits his/her query concept. An unmarked object is considered as having been marked negative by the user. As the query-concept learner process proceeds in an attempt to learn a query concept, it will submit successive sets of sample images to the user. If the attempt is successful, then the sample images in each successive sample set are likely to be progressively closer to the user's query concept. As a result, the user will be forced to more carefully refine his or her choices from one sample image set to the next. Thus, by presenting sets of images that are progressively closer to the query concept, the query-concept learner process urges the user to be progressively more selective and exacting in labeling sample images, as matching or not matching the user's current query-concept.

Step 2.c: This is the feature reduction process. It refines QCS and CCS.

Step 2.c.1: This process refines QCS. For each disjunctive term in the k-CNF, which models the QCS, the feature reduction process examines each positive-labeled sample image and uses function ƒ to compute the probability that the disjunctive term should be eliminated. The feature reduction process then calls procedure Vote to tally the votes among the positive-labeled sample images and compares the vote with threshold $K_d$ to decide whether that disjunctive term is to be removed. According to the procedure vote, if sufficient numbers of positive-labeled sample images contradict the QCS with respect to a disjunctive term (i.e., if the threshold is exceeded), the term is removed from the QCS. The procedure Vote, which decides how aggressive the feature reduction process is in eliminating terms, in Section 2.6.

Step 2.c.2: This process refines CCS. Similar to Step 2.c.1, for each conjunctive term in the CCS, modeled a k-DNF, the feature reduction process examines each negative-labeled sample image, and uses function ƒ to compute the probability that the conjunctive term should be eliminated. The feature reduction process then calls procedure Vote to tally the votes among the negative-labeled sample images. Then it compares the vote with threshold $K_c$ to decide whether that conjunctive term is to be removed from the k-DNF. According to the procedure vote, if sufficient numbers of negative-labeled instances satisfy the k-DNF with respect to a conjunctive term, the term is removed from the k-DNF.

Step 2.d: This process performs bookkeeping by reducing the unlabeled pool.

The refinement step terminates when the learning process converges to the target concept (Converged?=true) or the concept is collapsed (Collapsed?=true). (Converged? and Collapsed? are defined below.) In practice, the refinement stops when no unlabeled instance u can be found between the QCS and the CCS.

2.3 Sampling

The query-concept learner process invokes procedure Sample to select the next $K_\alpha$, unlabeled instances to ask for user feedback. From the college-admission example presented in Section 1, we learn that if we would like to minimize our work (i.e., call a minimum number of friends), we should choose our samples judiciously. But, what constitutes a good sample? We know that we learn nothing from a sample if It agrees with the concept in all terms.

It has the same attributes as another sample.

It is unlikely to be labeled positive.

To make sure that a sample is useful, the query-concept learner process employs two strategies:

1. Bounding the sample space: The learner process avoids choosing useless unlabeled instances by using the CCS and QCS to delimit the sampling boundary. The sample space bounded by the CCS and the QCS is referred to herein as the query concept sample space.

2. Maximizing the usefulness of a sample: The learner process chooses a sample that shall remove the maximum expected number of disjunctive terms. In other words, the learner process chooses a sample that can maximize the expected generalization of the concept.

The query-concept learner process employs an additional secondary strategy to facilitate the identification of useful samples:

3. Clustering of samples: Presenting to a user multiple samples that are too similar to one another generally is not a particularly useful approach to identifying a query concept since such multiple samples may be redundant in that they elicit essentially the same information. Therefore, the query-concept learner process often attempts to select samples from among different clusters of samples in order to ensure that the selected samples in any given sample set presented to the user are sufficiently different from each other. In a current embodiment, samples are clustered according to the feature sets manifested in their corresponding expressions. There are numerous known processes whereby the samples can be clustered in a multi-dimensional sample space. For instance, U.S. Provisional Patent Application, Ser. No. 60/324,766, filed Sep. 24, 2001, entitled, Discovery Of A Perceptual Distance Function For Measuring Similiarity, invnented by Edward Y. Chang, which is expressly incorporated herein by this reference, describes clustering techniques. For instance, samples may be clustered so as to be close to other samples with similar feature sets and so as to be distant from other samples with dissimilar feature sets. Clustering is particularly advantageous when there is a very large database of sample to choose from. It will be appreciated, however, that there may be situations in which it is beneficial to present to a user samples which are quite similar, especially when the k-CNF already has been significantly refined through user feedback.

Samples must be selected from the query concept sample space, which is bounded by the CCS and the QCS. Samples with expressions that are outside the CCS are ineligible for selection. Thus, for example, a sample whose expression includes a prescribed number of features that are absent from the k-DNF is ineligible for selection as a sample. In a present embodiment, a sample is ineligible if its expression includes even one feature that is not represented by a conjunctive term in the k-DNF. Moreover, in order to be effective in eliciting useful user feedback, a the expression representing a sample should be close to but not identical to the k-CNF. The question of how close to the k-CNF a sample's expression should be is an important one. That difference should be carefully selected if the learner process is to achieve optimal performance in terms of rapid and accurate resolution of a query-concept.

More specifically, it may appear that if we pick a sample that has more dissimilar disjunctions (compared to the QCS), we may have a better chance of eliminating more disjunctive terms. This is, however, not true. In once embodiment, a sample must be labeled by the user as positive to be useful for refining k-CNF which models the QCS. In other words, a user must indicate, either expressly or implicitly, that a given sample matches the user's query concept in order for that sample to be useful in refining the QCS. Unfortunately, a sample with more disjunctions that are dissimilar to the target concept is less likely to be labeled positive. Therefore, in choosing a sample, there is a trade off between those with more contradictory terms and those more likely to be labeled positive.

2.4 Estimation of Optimal Difference Between Sample and QCS

One of the criteria for selecting a sample is the closeness of the sample to the QCS, which is modeled as a k-CNF. A measure of the closeness of a sample to the k-CNF is the number of terms in sample's expression that differ from corresponding disjunctive terms of the k-CNF. Thus, one aspect of optimizing a query-concept learner process is a determination of the optimum difference between a sample and a k-CNF as measured by the number of terms of the sample's expression that differ from corresponding disjunctive terms of the k-CNF. As explained in the following sections, this optimum number is determined through estimation.

More specifically, let $\Psi$ denote the number of disjunctions remaining in the k-CNF. The number of disjunctions that can be eliminated in the current round of sampling (denoted as P) is between zero and $\Psi$. We can write the probability of eliminating P terms as $P_e(P)$. $P_e(P)$ is a monotonically decreasing function of P.

The query-concept learner process can be tuned for optimal performance by finding the P that can eliminate the maximum expected number of disjunctive terms, given a sample. The objective function can be written as $$P^* = \mathrm{argmax}_P E(P) = \mathrm{argmax}_P (P \times P_e(P)). \quad (1)$$

To solve P*, we must know $P_e(P)$, which can be estimated by the two methods described below: probabilistic estimation and empirical estimation.

2.5 Probabilistic Estimation

We first consider how to estimate P* using a probability model. As we have seen in the college-admission example, if a sample contradicts more disjunctive terms, it is more likely to be labeled negative (i.e., less likely to be labeled positive). For example, a sample that contradicts predicate $P_1$, is labeled negative only if $P_1$ is in the user's query concept. A sample that contradicts both predicates $P_1$ and $P_2$ is labeled negative if either $P_1$ or $P_2$ is in the user's query concept.

Formally, let random variable $\Phi_i$ be 1 if $P_i$ is in the concept and 0 otherwise. For simplicity, let us assume that the $\Phi_i$'s are iid (independent and identically distributed), and the probability of $\Phi_i$ being 1 is p ($0<p<1$). The probability of a sample contradicting P disjunctive terms is marked positive only when none of these P terms appears in the user's query concept. This probability is $(1-p)^P$. If we substitute $P_{e'}(P)$ by $(1-p)^P$ on the right-hand side of Equation 1, we get $$\max E(P) = P(1-p)^P.$$

If we take the derivative of E(P), we can find the optimal P value, denoted by P*:

$$\psi^* = \Psi, \text{ if } \frac{1}{\ln\frac{1}{1-p}} > \Psi, \ \psi^* = \frac{1}{\ln\frac{1}{1-p}}, \text{ otherwise}.$$

Of course, it may be too strong an assumption that the probability p of all disjunctions is iid. However, we do not need a precise estimation here for the following two reasons:

1. Precise estimation may not be feasible and can be computationally intensive.

2. An approximate estimation is sufficient for bootstrapping. Once the system is up and running for a while and collects enough data, it can empirically estimate $P_e(P)$ using its past experience. We discuss this process next.

2.6 Empirical Estimation

The probability of eliminating P terms, $P_e(P)$, can be estimated based on its past experience of the learner process. For each sample the learner process presents, a record can be created which sets forth how many disjunctions the sample contradicts with respect to the query concept and whether the sample is labeled positive. Once a sufficient amount of data has been collected, we can estimate $P_e(P)$ empirically. We then pick the P* that can eliminate the maximum expected number of disjunctive terms.

Again, a reasonable approach to estimate $P_e(P)$ is to use probabilistic estimation when the learner process first starts and then to switch to empirical estimation when the sufficient data has been collected. The transition from probabilistic estimation to empirical estimation takes place gradually and only after numerous users have employed the query-concept learner process. This transition does not occur during the course of a single user session.

Moreover, an abrupt transition from one estimation approach to the other could be problematic, since the two estimates of $P_e(P)$ may differ substantially. This could lead to a sudden change in behavior of the sampling component of the active learner. To remedy this problem, we employ a Bayesian smoothing approach. Essentially the probabilistic estimation is the prior guess at the distribution over P and the empirical approach is the guess based purely on the data that has been gathered so far. The Bayesian approach combines both of these guesses in a principled manner. Before we start, we imagine that we have seen a number of samples of P. After refinement iteration, we gather new samples for P; then we add them to our current samples and adjust $P_e(P)$.

For example, before we start, we assume that we have already seen samples with P=1 being labeled positive three out of five times and samples with P=2 being labeled positive seven out of 20 times. In other words, we have successfully eliminated P=1 term three times out of five, and we have successfully eliminated P=2 terms 7 times out of 20. Thus initially $P_e(P=1)=3/5=0.6$ and $P(P=2)=7/20=0.35$. Now suppose we do a query and in which we observe a sample with, P=2 being labeled positive. Then our new distribution is $P(P=1)=3/5$ and $P(P=2)=8/21$. We continue in this manner. At first, the prior assumption has quite an effect on our guess about the distribution. The more imaginary samples we have in our prior assumption, the larger its effect. For instance, if we assume that P=1 being labeled positive 30 out of 50 times and that P=2 being labeled positive 70 out of 200 times, it takes more real samples to change $P_e(P)$. With time, the more real samples we get, the less the effect of the prior assumption becomes, until eventually it has virtually no effect, and the observed data dominate the expression. This procedure gives us a smooth transition between the "probabilistic" and the "empirical" methods.

User Feedback in the Refinement of the QCS and CCS.

A user's indications of which sample images meet the user's current query-concept and which sample images do not meet the user's current query-concept are used as a basis for refinement of the QCS and the CCS, and therefore, as a basis for refinement of the query concept sample space which is bounded by the QCS and the CCS. One function in the refinement process is to evaluate whether or not a disjunctive term should be removed from the QCS which is modeled as a k-CNF. Another function in the refinement process is to evaluate whether a conjunctive term should be removed from the CCS which is modeled as a k-DNF. With regard to removal of a disjunctive term from the k-CNF, the way in which the function is achieved is to ascertain the level of difference, with respect to the term in question, between the k-CNF and the expressions for the one or more sample images indicated as matching the user's query-concept. Similarly, with regard to removal of a conjunctive term from the k-DNF, the way in which the function proceeds is to ascertain the level of difference, with respect to the term in question, between the k-DNF and the expressions for the one or more sample images indicated as not matching the user's query-concept. The specific approach to the employment of user feedback to refine the QCS and the CCS is a Procedure Vote described below.

2.7 Procedure Vote

A Procedure Vote employed in a present embodiment functions to refine the QCS and CCS while also accounting for model bias and user errors. More specifically, in the previous example, we assume that all samples are noise-free. This assumption may not be realistic. There can be two sources of noise:

Model bias: The target concept may not be in k-CNF.

User errors: A user may label some positive instances negative and vice versa.

Procedure Vote

The Procedure Vote process can be explained in the following general terms.

Input: y, $P_{t_i|y_j \in y}$, γ;

Output: $P_{t_i|y}$;

Begin

Sort $P_{t_i|y_j}$, in the descending order;

Return the $\gamma^{th}$ highest $P_{t_i|y}$;

End

Thus. the Procedure Vote controls the strictness of voting using γ. The larger the value of γ is, the more strict the voting is and therefore the harder it is to eliminate a term. When the noise level is high, we have less confidence in the correctness of user feedback. Thus, we want to be more cautious about eliminating a term. Being more cautious means increasing γ. Increasing γ, however, makes the learning process converge more slowly. To learn a concept when noise is present, one has to buy accuracy with time.

Procedure Vote Example

The parameter γ is the required number of votes to exceed a threshold, either $K_c$ (k-CNF) or $K_d$ (k-DNF). The value γ is a positive integer. The values $K_c$ and $K_d$ are values between zero and one. Suppose that we have three positive labeled instances y1, y2 and y3. Assume that c1 is a disjunctive term meaning that high-saturated red is true. Suppose that the QCS has a value of 1 on c1. Suppose that c1, c2, and c3 have values on c1 of 0.1, 0.2, and 0.3, respectively. The distance (i.e., the probability to remove) of y1 from the QCS with respect to c1 is 0.9. The distance of y2 from the QCS with respect to c1 is 0.8. The distance of y3 from the QCS with respect to c1 is 0.7.

Now suppose $K_c$=0.85. Based on the above hypothetical, then if γ=1, then c1 is removed from the QCS because at least one sample image, y1, differs from the QCS with respect to c1 by an amount greater than the threshold $K_c$. However, if γ=2, then c1 is not removed from the QCS because there are not two sample images that differ from the QCS with respect to c1 by an amount greater than the threshold $K_c$. As explained above the differences from QCS of y1, y2 and y3 with respect to c1 are 0.9, 0.8 and 0.7, respectively. Only one of these exceeds the threshold of $K_c$=0.85. Therefore, if γ=2, then c1 is not removed from the QCS.

The Procedure Vote operates in an analogous fashion to determine wheter or not to remove conjunctive terms from a CCS based upon $\gamma$ and $K_d$.

3 EXAMPLE

Below we show a toy example problem that illustrates the usefulness of the MEGA query-concept learner process. We will use this simple example to explain various aspects of our sampling approach and to contrast our approach with others. This example models an college admission concept that consists of a small number of Boolean predicates. (MEGA also works with fuzzy predicates.)

Suppose Jane plans to apply to a graduate school. Before filling out the forms and paying the application fees, she would like to estimate her chances of being admitted. Since she does not know the admission criteria, she decides to learn the admission concept by induction. She randomly calls up a few friends who applied last year and obtains the information shown in Table 1.

TABLE 1

Admision Samples.

| Name | GPA | GRE | Has Publications? | Was Admitted? |
|---|---|---|---|---|
| Joe | high | high | false | true |
| Mary | high | low | true | true |
| Emily | high | low | true | true |
| Lulu | high | high | true | true |
| Anna | low | low | true | false |
| Peter | low | high | false | false |
| Mike | high | Low | false | false |
| Pica | low | low | false | false |

There are three predicates in this problem, as shown in the table. The three predicates are:

GRE is high,

GPA is high, and

Has publications.

The first question arises: "Are all the random samples in Table 1 equally useful for learning the target concept?" Apparently not, for several reasons. First, it seems that Pica's record may not be useful since she was unlikely to be admitted (i.e., her record is unlikely to be labeled positive). Second, both Emily and Mary have the same record, so one of these two records can be redundant. Third, Lulu's record is perfect and hence does not provide additional insight for learning the admission criteria. This example indicates that choosing samples randomly may not produce useful information for learning a target concept.

Now, let us explain how MEGA's sampling method works more effectively than the random scheme. Suppose CCS and QCS are modeled as 2-CNF and 2-DNF, respectively. Their initial expressions can be written as follows:

$QCS=(GRE=\text{high})\wedge(GPA=\text{high})\wedge(\text{Publications}=\text{true})\wedge(GRE=\text{high} \vee GPA=\text{high})$
$\wedge(\text{Publications}=\text{true} \vee GPA=\text{high})\wedge(GRE=\text{high} \vee \text{Publications}=\text{true})$.

$CCS=(GRE=\text{high})\vee(\text{GPA}=\text{high})\vee(\text{Publications}=\text{true})\vee(GRE=\text{high} \wedge GPA=\text{high})$
$\vee(\text{Publications}=\text{true} \wedge GPA=\text{high})\vee(GRE=\text{high} \wedge \text{Publications}=\text{true})$.

Suppose $\psi^*$ is one. Jane starts by calling his friends whose "profile" fails by exactly one disjunctive term. Jane calls three people and two tell her that they were admitted (i.e., they are the positive-labeled instances) as shown in Table 2.

Based on the feedback, Jane use the positive labeled instances (Joe and Emily) to generalize the QCS concept to $QCS=(GPA=\text{high})\wedge(\text{Publications}=\text{true} \vee GPA=\text{high})\wedge(GRE=\text{high} \vee \text{Publications}=\text{true})\wedge(GPA=\text{high} \vee GRE=\text{high})$. At the same time, the CCS is shrunk by using the negative labeled instance (Dora) to $CCS=(GPA=\text{high})\vee(GRE=\text{high} \wedge GPA=\text{high})\vee(\text{Publications true} \wedge GPA=\text{high})$.

TABLE 2

MEGA ampling Rounds.

| Round # | Name | GPA | GRE | Has Publications? | Was Admitted? |
|---|---|---|---|---|---|
| 1st | Joe | high | high | false | true |
| | Emily | high | low | true | true |
| | Dora | low | high | true | false |
| 2nd | Kevin | high | low | false | false |

In the second round, Jane attempts to call friends to see if any of the remaining terms can be removed. He calls Kevin, whose profile is listed in the table. Since this sample is labeled negative, the QCS is not changed. But the CCS is reduced to $(GRE=\text{high} \vee GPA=\text{high})\vee(\text{Publications}=\text{true} \wedge GPA=\text{high})$.

Simplifying and rewriting both QCS and CCS gives us the following identical expression:

$$QCS=(GPA=\text{high})\vee(GRE=\text{high} \vee \text{Publications}=\text{true}).$$

The concept converges and the refinement terminates at this point. We have learned the admission criterion—a high GPA and either a high GRE or publications□

4 Multi-resolution/Hierarchical Learning

The MEGA scheme described so far does not yet concern its scalability with respect to M (the number of features for depicting an object). In this section, we describe MEGA's multi-resolution/hierarchical learning algorithm that tackles the dimensionality-curse problem.

The number of disjunctions in a k-CNF (and, likewise, the conjunctives in a k-DNF) can be written as $$\sum_{i=1}^{k} \binom{M}{i}. \tag{2}$$

When M is large, a moderate k can result in a large number of disjunctive terms in a k-CNF, which causes high space and time complexity for learning. For instance, an image database that we have built [1] characterizes each image with 144 features (M=144). The initial number of disjunctions in a 3-CNF is half a million and in a 4-CNF is eighteen million.

To reduce the number of terms in a k-CNF, we divide a learning task into G sub-tasks, each of which learns a subset of the features. Dividing a feature space into G subspaces reduces both space and time complexity by a factor of $O(G^{k-1})$. For instance, setting G=12 in our image database reduces both space and time complexity for learning a 3-CNF by 140 times (the number of terms is reduced to 3,576), and for learning a 4-CNF by 1,850 times (the number of terms is reduced to 9,516). The savings is enormous in both space and learning time. (The wall-dock time is less than a second for one learning iteration for a 4-CNF concept on a Pentium-III processor.)

This divide-and-conquer approach may trade precision for speed, since some terms that involve features from more than one feature subset can no longer be included in a concept. The loss of precision can be reduced by organizing a feature space in a multi-resolution fashion. The term feature resolution and a weak form of feature resolution that we call feature correlation are defined as follows:

Definition 5: Feature resolution: Feature. $P_i$ is said to have higher resolution than feature $P_i$ if the presence of $P_i$ implies the presence of $P_j$ (or the absence of $P_j$ implies the absence of $P_i$). Let $P_i \in P_j$ denote that $P_i$ has higher resolution than $P_j$. We say that $P_i \in P_j$ if and only if the conditional probability $P(P_j|P_i)=1$.

Definition 6: Feature correlation: A feature $P_i$ is said to have high correlation with feature $P_j$ if the presence of $P_i$ implies the presence of $P_j$ and vice versa with high probability. We say that $P_i – P_j$ if and only if the conditional probability $P(P_{j|Pi)|P(Pj}) = P(P_i|P_j)|P(P_i) \geqq \delta$.

MEGA takes advantage of feature resolution and correlation in two ways—inter-group multi-resolution and intra-group multi-resolution—for achieving fast and accurate learning. Due to the space limitation, we limit our description of the heuristics of MEGA's multi-resolution learning algorithm to the following.

- Inter-group multi-resolution features. If features can be divided into groups of different resolutions, we do not need to be concerned with terms that involve inter-group features. This is because any inter-group terms can be subsumed by intra-group terms. Formally, if $P_i$ and $P_j$ belong to two feature groups and $P(P_i|P_j)=1$, then $P_1 \vee P_2 = P_2$ and $P_1 \wedge P_2 = P_1$
- Intra-group multi-resolution features. Within a feature group, the more predicates involved in a disjunctive term, the lower the resolution of the term. Conversely, the more number of predicates involves in a conjunctive term, the higher resolution the term is. For instance, in a 2-CNF that has two predicates $P_1$ and $P_2$, term $P_1$ and term $P_2$ have a higher resolution than the disjunctive term $P_1 \vee P_2$ and a lower resolution than the conjunctive term $P_1 \wedge P_2$. The presence of $P_1$ or $P_2$ makes the presence of $P_1 \vee P_2$ useless. Based on this heuristic, MEGA examines a term only when all its higher resolution terms have been eliminated.

5 Example for Multi-resolution Learning

Suppose we use four predicates (i.e., features) to characterize an images. Suppose these four predicates are vehicle, car, animal, and tiger. A predicate is true when the object represented by the predicate is present in the image. For instance, vehicle is true when the image contains a vehicle.

A 2-CNF consisting of these four predicates can be written as the following:

$$\text{vehicle} \wedge \text{car} \wedge \text{animal} \wedge \text{tiger} \wedge (\text{vehicle} \vee \text{car}) \wedge (\text{vehicle} \vee \text{animal}) \wedge (\text{vehicle} \vee \text{tiger}) \wedge (\text{car} \vee \text{animal}) \wedge (\text{car} \vee \text{tiger}) \wedge (\text{animal} \vee \text{tiger}) \quad (1)$$

As the number of predicates increases, the number of terms in a k-CNF can be very large. This large number of terms not only incur a large amount of memory requirement but also long computational time to process them. To reduce the number of terms, we can divide predicates into subgroups. In general, when we divide a k-CNF into G groups, we can reduce both memory and computational complexity by G∧k-1 folds. For instance, let k=3 and G=10.

The saving is 100 folds.

Dividing predicates into subgroups may lose some intergroup terms. Suppose we divide the four predicates into two groups: Group one consists of vehicle and car, and group two consists of animal and tiger. We then have the following two sets of 2-CNF:

From group one, we have: vehicle and car and (vehicle or car).

From group two, we have: animal and tiger and (animal or tiger).

When we join these two 2-CNF with an "and" operator, we have:

$$\text{vehicle} \wedge \text{car} \wedge (\text{vehicle} \vee \text{car}) \wedge \text{animal} \wedge \text{tiger} \wedge (\text{animal} \vee \text{tiger}) \quad (2)$$

Comparing expression (2) to expression (1), we lose four inter-group disjunctions: (vehicle ∨ animal), (vehicle ∨ tiger), (car ∨ animal), and (car ∨ tiger).

Losing terms may degrade the expressiveness of k-CNF. However, we can divide the predicates intelligently so that the effect of losing terms is much less significant.

The effect of losing terms is null if we can divide predicates in a multi-resolution manner. Follow the example above. If we divide predicates into group one: (vehicle, animal); and group two: (car, tiger), then the losing terms (vehicle or car), (animal or tiger) do not affect the expressiveness of the k-CNF. This is because car has a higher resolution than vehicle, and (car or vehicle)=car. Likewise, (animal or tiger)=tiger.

We still lose two terms: (vehicle ∨ tiger), (animal ∨ car). However, both terms can be covered by (vehicle ∨ animal) and hence we do not lose significant semantics if features are divided by their resolutions.

6 Example: Muli-resolution Processing

Let us reuse the k-CNF in the above example.

$$\text{vehicle} \wedge \text{car} \wedge \text{animal} \wedge \text{tiger} \wedge (\text{vehicle} \vee \text{car}) \wedge (\text{vehicle} \vee \text{animal}) \wedge (\text{vehicle} \vee \text{tiger}) \wedge (\text{car} \vee \text{animal}) \wedge (\text{car} \vee \text{tiger}) \wedge (\text{animal} \vee \text{tiger}) \quad (1)$$

Suppose we have an image example which contains a cat on a tree, and the image is marked positive. We do not need to examine all terms. Instead, we can just first examine the lowest resolution temrs. In this case, since the vehicle predicate (low resolution one) is contracted, we do not even need to examine the car predicate that has a finer resolution than vehicle.

The elimination of the vehicle predicate eliminates all its higher resolution counterparts, and hence car.

The cat object satisfy the animal predicate. We need to examine the tiger predicate which has a finer resolution than animal. Since tiger is not present, the tiger predicate is eliminated. We have animal retained in the concept.

What is the advantage of examining predicates from low to high resolutions? We do not have to allocate memory for the higher resolution predicates until the lower ones are satisfied. We can save space and time.

7 Example: Multiple Pre-cluster Sets of Sample Images

Suppose we have N images. We pre-group these images into M clusters. Each cluster has about N/M images, and the images in each cluster are "similar" to one another. We can pick one image from each cluster to represent the cluster. In other words, we can have M images, one from each cluster, to represent the N images.

Now, if we need to select samples, we do not have to select samples from the N-image pool. We can select images from the M-image pool. Every time when we eliminate one of these M images, we eliminate the cluster that the image represents. Let N=one billion and M=one thousand. The amount of processing speed can be improve by one million folds.

Characterizing Images with Expressions Comprising Features Values

Each sample image is characterized by a set of features. Individual features are represented by individual terms of an expression that represents the image. The individual terms are calculated based upon constituent components of an image. For instance, in a present embodiment of the invention, the pixel values that comprise an image are processed to derive values for the features that characterize the image. For each image there is an expression comprising a plurality of feature values. Each value represents a feature of the image. In a present embodiment, each feature is represented by a value between 0 and 1. Thus, each image corresponds to an expression comprised of terms that represent features of the image.

The following Color Table and Texture Table represent the features that are evaluated for images in accordance with a present embodiment of the invention. The image is evaluated with respect to 11 recognized cultural colors (black, white, red, yellow, green, blue, brown, purple, pink, orange and gray) plus one miscellaneous color for a total of 12 colors. The image also is evaluated for vertical, diagonal and horizontal texture. Each image is evaluated for each of the twelve (12) colors, and each color is characterized by the nine (9) color features listed in the Color Table. Thus, one hundred and eight (108) color features are evaluated for each image. In addition, each image is evaluated for each of the thirty-six (36) texture features listed in the Texture Chart. Therefore, one hundred and forty-four (144) features are evaluated for each image, and each image is represented by its own 144 (feature) term expression.

| Color Table |
|---|
| Present % |
| Hue - average |
| Hue - variance |
| Saturation - average |
| Saturation - variance |
| Intensity - average |
| Intensity - variance |
| Elongation |
| Spreadness |

Texture Table

| | Coarse | Medium | Fine |
|---|---|---|---|
| Horizontal | Avg. Energy | Avg. Energy | Avg. Energy |
| | Energy Variance | Energy Variance | Energy Variance |
| | Elongation | Elongation | Elongation |
| | Spreadness | Spreadness | Spreadness |
| Diagonal | Avg. Energy | Avg. Energy | Avg. Energy |
| | Energy Variance | Energy Variance | Energy Variance |
| | Elongation | Elongation | Elongation |
| | Spreadness | Spreadness | Spreadness |
| Vertical | Avg. Energy | Avg. Energy | Avg. Energy |
| | Energy Variance | Energy Variance | Energy Variance |
| | Elongation | Elongation | Elongation |
| | Spreadness | Spreadness | Spreadness |

The computation of values for the image features such as those described above is well known to persons skilled in the art.

Color set, histograms and texture feature extraction are described in, John R. Smith and Shih-Fu Chang, Tools and Techniques for Color Image Retrieval, *IS&T/SPIE Proceedings*, Vol. 2670, Storage & Retrieval for Image and Video Database IV, 1996, which is expressly incorporated herein by this reference.

Color set and histograms as well as elongation and spreadness are described in, E. Chang, B. Li, and C. L. Towards Perception-Based Image Retrieval. *IEEE, Content-Based Access of Image and Video Libraries*, pages 101–105, June 2000, which is expressly incorporated herein by this reference.

The computation of color moments is described in, Jan Flusser and Tomas Suk, On the Calculation of Image Moments, Research Report No. 1946, January 1999, *Journal of Pattern Recognition Letters*, which is expressly incorporated herein by this reference. Color moments are used to compute elongation and spreadness.

There are mulitple resolutions of color features. The presence/absence of each color is at the coarse level of resolution. For instance, coarsest level colr evaluation determines whether or not the color red is present in the image. This determination can be made through the evaluation of a color histogram of the entire image. If the color red comprises less than some prescribed percentage of the overall color in the image, then the color red may be determined to be absent from the image. The average and variance of hue, saturation and intensity (HVS) are at a middle level of color resolution . Thus, for example, if the color red is determined to be present in the image, then a determination is made of the average and variance for each of the red hue, red saturation and red intensity. The color elongation and spreadness are at the finest level of color resolution. Color elongation can be characterized by multiple (7) image moments. Spreadness is a measure of the spatial variance of a color over the image.

There are also multiple levels of resolution for texture features. Referring to the Texture Table, there is a an evaluation of the coarse, middle and fine level of feature resolution for each of vertical, diagonal and horizontal textures. In other words, an evaluation is made for each of the thrity-six (36) entries in the Texture Table. Thus, for example, referring to the horizontal-coarse (upper left) block in the Texture Table, an image is evaluated to determine feature values for an average coarse-horizontal energy feature, a coarse-horizontal energy varianc feature, coarse-horizontal elongation feature and a coarse-horizontal spreadness feature. Similarly, for example, referring to the medium-diagonal (center) block in the Texture Table, an image is evaluated to determine feature values for an average medium-diagonal energy feature, a medium-diagonal energy varianc feature, medium-diagonal elongation feature and a medium-diagonal spreadness feature.

Multi-Resolution Processing of Color Features

As explained in the above sections, the MEGA query-concept learner process can evaluate samples for refinement through term removal in a multi-resolution fashion. It will be appreciated that multi-resolution refinement is an optimization technique that is not essential to the invention. With respect to colors, multi-resolution evaluation can be described in general terms as follows. With respect to removal of disjunctive terms from the QCS, first, there is an evaluation of differences between positive labeled sample images and the QCS with respect to the eleven cultural colors and the one miscellaneous color. During this first phase, only features relating to the presence/absence of these twelve colors are evaluated. Next, there is an evaluation of the differences between positive labeled sample images and the QCS with respect to hue saturation and intensity (HVS). However, during this second phase, HVS features are evaluated relative to the QCS only for those basic coarse color features, out of the original twelve, that are found to be not different from the QCS. For example, if the red feature of a sample image is found to not match the red feature of the QCS, then in the second phase, there is no evaluation of the HVS for the color red. Finally, there is an evaluation of Elongation and Spreadness. However, during this third phase, Elongation and Spreadness features are evaluated relative to the QCS only for those cultural colors that are found to be not different from the QCS.

The evaluation of conjunctive color terms of the CCS for removal proceeds in an analogous manner with respect to negative-labeled sample images.

Multi-Resolution Processing of Texture Features

With respect to textures, multi-resolution evaluation can be described in general terms as follows. It will be appreciated that multi-resolution refinement is an optimization technique that is not essential to the invention. With respect to removal of disjunctive terms from the QCS, first, there is an evaluation of differences between positive labeled sample images and the QCS with respect to the the coarse-horizontal, coarse-diagonal and coarse-vertical features. It will be noted that each of these three comprises a set of four features. During this first phase, only the twelve coarse texture feature are evaluated. Next, there is an evaluation of the differences between positive labeled sample images and the QCS with respect to the meium texture features, medium-horizontal, medium-diagonal and medium-vertical. However, during this second phase, medium texture features are evaluated relative to the QCS only for those basic coarse texture features that are found to be not different from the QCS. For instance, if a sample image's coarse-horizontal average energy is found to not match the corresponding feature in the QCS, then the medium-horizontal average energy is not evaluated. Finally, there is an evaluation of the differences between positive labeled sample images and the QCS with respect to the fine texture features, fine-horizontal, fine-diagonal and fine-vertical. However, during this third phase, fine texture features are evaluated relative to the QCS only for those medium texture features that are found to be not different from the QCS. For instance, if a sample image's medium-diagonal spreadness is found to not match the corresponding feature in the QCS, then the fine-diagonal spreadness is not evaluated.

The evaluation of conjunctive texture terms of the CCS for removal proceeds in an analogous manner with respect to negative-labeled sample images.

Relationship Between MEGA and $SVM_{active}$ and SVM-Dex

To make the query-concept learning even more efficient, a high-dimensional access method can be employed [12] to ensure that eliminating/replacing features incurs minimum additional search overhead. Commonly owned provisional patent application Ser. No. 60/292,820, filed May 22, 2001; and also claims the benefit of the filing date of commonly assigned provisional patent application, Ser. No. 60/281,053, filed Apr. 2, 2001, which is expressly incorporated herein by this reference, discloses such an access method. MEGA can speed up its sampling step by using the support vectors generated by SVMs. The commonly owned provisional patent applications which are expressly incorporated above, discloses the use of SVMs. It will be appreciated that $SVM_{active}$ and SVMDex are not part of the MEGA query-concept learner process per se. However, is intended that the novel learner process disclosed in detail herein will be used in conjunction with SVM and SVMDex.

8 User Interface Examples

The following provides an illustrative example of the user interface perspective of the novel query-concept learner process.

We present examples in this section to show the learning steps of MEGA and $SVM_{Active}$ in two image query scenarios: image browsing and similarity search.

Note that MEGA, and $SVM_{Active}$ are separate processes. In a proposed system, MEGA and $SVM_{Active}$ will be used together. The invention that is the focus of this patent application pertains to MEGA not $SVM_{Active}$. Thus, $SVM_{Active}$ is not disclosed in detail herein. To learn more about $SVM_{Active}$, refer to the cited ppapers by Edward Chang.

Image browsing. A user knows what he/she wants but has difficulty articulating it. Through an interActive browsing session, MEGA or $SVM_{Active}$ learns what the user wants.

Similarity search. After MEGA or $SVM_{Active}$ knows what the user wants, the search engine can perform a traditional similarity search to find data objects that appear similar to a given query object.

[FIG. 1: Wild Animal Query Screen #1.]

8.1 MEGA Query Steps

In the following, we present an interActive query session using MEGA. This interActive query session involves seven screens that are illustrated in seven figures. The user's query concept in this example is "wild animals."

Screen 1. Initial Screen. Our PBIR system presents the initial screen to the user as depicted in FIG. 1. The screen is split into two frames vertically. On the left-hand side of the screen is the learner frame; on the righthand side is the similarity search frame. Through the learner frame, PBIR learns what the user wants via an intelligent sampling process. The similarity search frame displays what the system thinks the user wants. (The user can set the number of images to be displayed in these frames.)

Screen 2. Sampling and relevance feedback starts. Once the user clicks the "submit" button in the initial frame, the sampling and relevance feedback step commences to learn what the user wants. The PBIR system presents a number of samples in the learner frame, and the user highlights images that are relevant to his/her query concept by clicking on the relevant images.

[FIG. 2: Wild Animal Query Screen #2.]

[FIG. 3: Wild Animal Query Screen #3.]

[FIG. 4: Wild Animal Query Screen #4.]

[FIG. 5: Wild Animal Query Screen #5.]

[FIG. 6: Wild Animal Query Screen #6.]

[FIG. 7: Wild Animal Similarity Query (Screen #7).]

As shown in FIG. 2, three images (the third image in rows one, two and four in the learner frame) are selected as relevant, and the rest of the unmarked images are considered irrelevant. The user indicates the end of his/her selection by clicking on the submit button in the learner screen. This action brings up the next screen.

Screen 3. Sampling and relevance feedback continues. FIG. 3 shows the third screen. At this time, the similarity search frame still does not show any image, since the system has not been able to grasp the user's query concept at this point. The PBIR system again presents samples in the learner frame to solicit feedback. The user selects the second image in the third row as the only image relevant to the query concept.

Screen 4. Sampling and relevance feedback continues. FIG. 4 shows the fourth screen. First, the similarity search frame displays what the PBIR system thinks will match the user's query concept at this time. As the figure indicates, the top nine returned images fit the concept of "wild animals." The user's query concept has been captured, though somewhat fuzzily. The user can ask the system to further refine the target concept by selecting relevant images in the learner frame. In this example, the fourth image in the second row and the third image in the fourth row are selected as relevant to the concept. After the user clicks on the submit button in the learner frame, the fifth screen is displayed.

Screen 5. Sampling and relevance feedback continues. The similarity search frame in FIG. 5 shows that ten out of the top twelve images returned match the "wild animals" concept. The user selects four relevant images displayed in the learner frame. This leads to the final screen of this learning series.

Screen 6. Sampling and relevance feedback ends. FIG. 6 shows that all returned images in the similarity search frames fit the query concept.

Screen 7. Similarity search. At any time, the user can click on an image in the similarity search frame to request images that appear similar to the selected image. This step allows the user to zoom in onto a specific set of images that match some appearance criteria, such as color distribution, textures and shapes. As shown in FIG. 7, after clicking on one of the tiger images, the user will find similar tiger images returned in the similarity search frame. Notice that other wild animals are ranked lower than the matching tiger images, since the user has concentrated more on specific appearances than on general concepts.

In summary, in this example we show that our PBIR system effeActively uses MEGA to learn a query concept. The images that match a concept do not have to appear similar in their low-level feature space. The learner is able to match high-level concepts to low-level features directly through an intelligent learning process. Our PBIR system can capture images that match a concept through MEGA or $SVM_{Active}$, whereas the traditional image systems can do only appearance similarity searches. Again, as illustrated by this example, MEGA can capture the query concept of wild animal (wild animals can be elephants, tigers, bears, and etc), but a traditional similarity search engine can at best select only animals that appear similar.

In Appendix, we attach the color screen dumps of the above "wild animals" query. In addition, we attach the five query examples for five concepts: architectures, fireworks, flowers, food, and people. These examples show that the PBIR system can fuzzily capture a concept usually in two to three feedback iterations and can comprehend a target concept very well in three to five iterations.

8.2 $SVM_{Active}$ Sample Results

[FIG. 8: Flowers and Tigers Sample Query Results from $SVM_{Active}$]

Finally, FIG. 8 shows two sample results of using $SVM_{Active}$ one from a top-10 flowers query, and one from a top-10 tigers query. The returned images do not necessarily have the same lowlevel features or appearance. The returned flowers have colors of red, purple, white, and yellow, with or without leaves. The returned tiger images have tigers of different postures on different backgrounds.

8.3 Experiments

In this section, we report our experimental results. The goals of our experiments were 1: To evaluate whether MEGA can learn k-CNF concepts accurately in the presence of a large number of irrelevant features.

2: To evaluate whether MEGA can converge to a target concept faster than traditional sampling schemes.

3: To evaluate whether MEGA is robust for noisy data or under situations in which the unknown target concept is not expressible in the provided hypothesis space.

We assume all target concepts are in 3-CNF. To conduct our experiments, we used both synthesized data and real-world data.

Synthesized data. We generated three datasets using two different distributions: uniform and Gaussian. Each instance has 10 features between 0 and 1. The values of each feature in a dataset are independently generated. For the Gaussian distribution, we set its mean to 0.5 and its standard deviation to 1/6. Each dataset has 10,000 vectors.

Real-world data. We conducted experiments on a 1,500-image dataset collected from Corel image CDs and the Internet. The images in the dataset belong to 10 categories—architecture, bears, clouds, flowers, landscape, people, objectionable images, tigers, tools, and waves. Each image is characterized by a 144 dimensions feature vector (described in Section 4.3).

We used precision and recall to measure performance. We tallied precision/recall for up to only 10 iterations, since we deemed it unrealistic to expect an interactive user to conduct more than 10 rounds of relevance feedback. We compared MEGA with the five sampling schemes: random, bounded random, nearest neighbor, query expansion, and aggressive. We used these sampling schemes for comparison because they are employed by some state-of-the-art systems described in Section 5.

FIG. 4: Sampling Schemes

FIG. 4 shows how some of these sampling algorithms work. The main features of the sampling schemes are given below.

Random: Samples are randomly selected from the bulk of the domain (FIG. 4(*a*)).

Bounded Random: Samples are randomly selected from between QCS and CCS (FIG. 4(*b*)).

Nearest Neighbor. Samples are selected from the nearest neighborhood of the center of the positive-labeled instances.

Query Expansion: Samples are selected from the neighborhood of multiple positive-labeled instances.

Aggressive: Samples are selected from the unlabeled ones that satisfy the most general concepts in CCS (FIG. 4(*c*)).

MEGA: Samples are selected between QCS and CCS to eliminate the maximum expected number of terms (FIG. 4(*d*)).

We ran experiments on datasets of different distributions and repeated each experiment 10 times. The experimental results are presented in two groups. We first show the results of the experiments on the synthesized datasets. We then show the results on a 1,500-image dataset.

8.4 Query Concept Learning Applied to Synthesized Datasets

We tested many target concepts on the two synthesized datasets. Due to space limitations, we present only three representative test cases, those that represent a disjunctive concept, a conjunctive of disjunctions, and a complex concept with more terms. The three tests are 1: $P_1 \vee P_2$, 2: $(P_1 \vee P_2) \wedge P_3$, 3: $P_1 \wedge (P_2 \vee P_3) \wedge (P_4 \vee P_5 \vee P_6) \wedge (P_2 \vee P_4 \vee P_7)$, We first assume that the dataset is free of user errors and set the sample size $K_\alpha$ to 20. In the remainder of this section, we report our initial results, and then we report the effects of model bias and user errors on MEGA (Sections 4.2.1 and 4.2.2).

8.4.1 Experimental Results

FIG. 5: Precision vs. Recall (10 Features)

FIG. 5 presents the precision/recall after three user iterations of the six sampling schemes learning the two concepts, $(P_1 \vee P_2) \wedge P_3$ and $P_1 \wedge (P_2 \vee P_3) \wedge (P_4 \vee P_5 \vee P_6) \wedge (P_2 \vee P_4 \vee P_7)$. The performance trend of the six schemes is similar at different numbers of iterations. We deem three iterations a critical juncture where a user would be likely to lose his/her patience, and thus we first present the results at the end of the third iteration. The performance curve of MEGA far exceeds that of the other five schemes at all recall levels. Note that for learning both concepts, MEGA achieves 100% precision at all recall levels.

Next, we were interested in learning the improvement on search accuracy with respect to the number of user iterations. This improvement trend can tell us how fast a scheme can learn a target concept. We present a set of tables and charts where we fix recall at 0.5 and examine the improvement in precision with respect to the number of iterations.

approach but both suffer from slow convergence. Sampling in the nearest neighborhood tends to result in low precision/recall if the initial query samples are not perfect.

The precision at a given recall achieved by the experiments applied to the Gaussian dataset is lower than that of the experiments applied to the uniform dataset. This is because when an initial query point falls outside of, say, two times the standard deviation, we may not find enough positive examples in the unlabeled pool to eliminate all superfluous disjunctions. Since this situation is rare, the negative effect on the average precision/recall is insignificant. The performance gaps between the six sampling schemes were similar when we applied them to the two datasets; therefore, we report only the results of the experiments on the uniform dataset in the remainder of this section.

TABLE 3

Learning $P_1 \vee P_2$ Applied to A Uniform Dataset.

| Rnd # | Random | B-Random | N-Neighbor | Q-Expansion | Aggressive | Algorithm MEGA |
|---|---|---|---|---|---|---|
| 1 | 0.23715 | 0.23715 | 0.20319 | 0.20319 | 0.23715 | 0.23715 |
| 2 | 0.44421 | 0.44421 | 0.48207 | 0.44422 | 0.44421 | 0.30098 |
| 3 | 0.49507 | 0.50389 | 0.41036 | 0.45219 | 0.50389 | 1.00000 |
| 4 | 0.50389 | 1.00000 | 0.36753 | 0.51394 | 1.00000 | 1.00000 |
| 5 | 1.00000 | 1.00000 | 0.35857 | 0.78088 | 1.00000 | 1.00000 |
| 6 | 1.00000 | 1.00000 | 0.33865 | 0.88247 | 1.00000 | 1.00000 |
| 7 | 1.00000 | 1.00000 | 0.32669 | 0.93028 | 1.00000 | 1.00000 |
| 8 | 1.00000 | 1.00000 | 0.32271 | 0.93028 | 1.00000 | 1.00000 |
| 9 | 1.00000 | 1.00000 | 0.29880 | 0.93028 | 1.00000 | 1.00000 |
| 10 | 1.00000 | 1.00000 | 0.32570 | 0.93028 | 1.00000 | 1.00000 |

Tables 3 and 4 present the precision of six sampling schemes in learning $P_1 \vee P_2$ in 10 rounds of relevance feedback. These tables show that MEGA consistently converges to the target concept in the smallest number of iterations. Applied to the Gaussian dataset, MEGA converges after four iterations. The random sampling scheme requires on average two more iterations to converge. The performance of the bounded random scheme and the performance of the aggressive scheme fall between that of the random scheme and that of MEGA. On the aggressive scheme, which attempts to remove as many terms as possible, the chosen samples are less likely to be labeled positive and hence make less of a contribution to the progress of learning the QCS. We will show shortly that the gaps in performance between MEGA and the other schemes increase as the target concept becomes more complex.

FIG. 6 depicts the results of the second and third tests on the uniform dataset. The figure shows that MEGA outperforms the other scheme (in precision at a fixed recall) by much wider margins. It takes MEGA only three iterations to learn these concepts, whereas the other schemes progress more slowly. Schemes like nearest-neighbor and query expansion fail miserably because they suffer from severe model bias. Furthermore, they cannot eliminate irrelevant features quickly.

TABLE 4

Learning $P_1 \vee P_2$ Applied to Gaussian Dataset.

| Rnd # | Random | B-Random | N-Neighbor | Q-Expansion | Aggressive | Algorithm MEGA |
|---|---|---|---|---|---|---|
| 1 | 0.08236 | 0.08236 | 0.29970 | 0.29970 | 0.08236 | 0.08236 |
| 2 | 0.22178 | 0.22178 | 0.65722 | 0.46684 | 0.36241 | 0.32438 |
| 3 | 0.37332 | 0.37332 | 0.64907 | 0.47027 | 0.80584 | 0.65982 |
| 4 | 0.38200 | 0.51249 | 0.64134 | 0.46598 | 0.80584 | 1.00000 |
| 5 | 0.51249 | 1.00000 | 0.63941 | 0.66237 | 0.80584 | 1.00000 |
| 6 | 1.00000 | 1.00000 | 0.62782 | 0.46491 | 0.80584 | 1.00000 |
| 7 | 1.00000 | 1.00000 | 0.61000 | 0.47135 | 0.80584 | 1.00000 |
| 8 | 1.00000 | 1.00000 | 0.61000 | 0.61258 | 0.80584 | 1.00000 |
| 9 | 1.00000 | 1.00000 | 0.61000 | 0.48830 | 0.80584 | 1.00000 |
| 10 | 1.00000 | 1.00000 | 0.61000 | 0.64198 | 0.80584 | 1.00000 |

The results of all datasets and all subsequent tests show that both the nearest neighbor and the query expansion schemes converge very slowly. The result is consistent with that reported in [16, 18], which shows that the query expansion approach does better than the nearest neighbor FIG. 6: Precision of Six Schemes at Recall=50%

8.5 Addition Results

We also performed tests on a 20 and 30 feature dataset. The results are shown in FIGS. 7 and 8. The higher the dimension, the wider the performance gap between MEGA and the rest of the schemes. This is because MEGA can eliminate irrelevant features much faster than the other schemes.

FIG. 7: Precision vs. Recall (20 Features)

8.5.1 Model Bias Test

FIG. 8: Precision vs. Recall (30 Features)

We have shown that MEGA outperforms the other five sampling schemes significantly when the target query concept is in k-CNF. We now present test cases that favor a convex concept, which can be expressed as a linear weighted sum of features to examine how MEGA performs. The target concept we tested is in the form of $\alpha P_1+(1-\alpha)P_2$, where the value of $\alpha$ is between zero and one.

In this set of tests, we compare MEGA with the nearest neighbor scheme and the query expansion scheme, which are the representative schemes designed for refining convex concepts. We started by picking 20 random images to see how fast each scheme would converge to the target concepts. Again, we repeated each experiment 100 times and recorded each scheme's average precision and recall.

We tested six convex concepts by setting $\alpha$=0, 0.1, . . . , 0.5. Below, we report the precision/recall of the three learning methods on two concepts: $0.3P_1+0.7P_2$ ($\alpha$=0.3) and $0.5P_1+0.5P_2$($\alpha$=0.5). Setting $\alpha$ in this range makes MEGA suffer from model bias. (We will discuss the reasons shortly.) FIG. 9 presents the precision/recall of the three schemes for learning these two concepts after three user iterations. Surprisingly, even though MEGA is not modeled after a convex concept, the performance curve of MEGA far exceeds that of the other two schemes in learning both concepts.

To understand the reasons why MEGA works better than the nearest neighbor and query expansion schemes and how each scheme improves from one iteration to another, we present a set of charts where we fix recall at 0.5 and examine the trend of precision with respect to the number of iterations. (The trend at other recall levels is similar.) FIG. 10(*a*) shows the result of learning concept $P_2$ (setting $\alpha$=0). MEGA does very well in this experiment, since it suffers no model bias. Neither the nearest neighbor nor the query expansion scheme does as well because they are slow in eliminating terms.

What if a user does have a weighted linear query concept? Even so, MEGA can approximate this model fairly well. FIGS. 10(*b*), (*c*), (*d*), (*e*), and (*f*) all show that MEGA achieves higher precision faster than either the nearest neighbor or the query expansion scheme under all $\alpha$ settings. We summarize our observations as follows:

FIG. 9: Recall vs. Precision (Model Bias Test)

1. When $\alpha$=0 (or 1), the concept has only one predicate and MEGA has better precision by a wide margin than these traditional schemes, since it can converge much faster. Even when $\alpha$ is near 0 or 1, the precision of MEGA decreases slightly but still outperforms the traditional schemes, as shown in FIG. 10(*b*). This is because although MEGA suffers slightly from model bias, its fast convergence makes it a better choice when the number of iterations is relatively small.

2. When $\alpha$=0.5, MEGA can approximate the convex concept by $P_1 \wedge P_2$. FIGS. 10(*e*) and (*f*) show that when a is near 0.5, MEGA trails the query expansion by only a slim margin after five/six user iterations. Although the query expansion scheme eventually converges to the target concept, MEGA's fast improvement in precision in just a couple of iterations makes it more attractive, even though slower learning schemes might eventually achieve a slightly higher precision.

3. FIGS. 10(*c*) through (*e*) show that when a is between 0.2 and 0.4, MEGA suffers from model bias and its achievable precision can be low. However, our primary concern is with the range between three and five iterations that will probably reflect the patience of on-line users. For this purpose, MEGA is more attractive even with its model bias. When $\alpha$=0.2, MEGA reaches 70% precision after two iterations whereas the query expansion scheme requires seven iterations to reach the same precision.

8.5.2 User Error Test

In this experiment, we learned the $(P_1 \vee P_2) \wedge (P_3 \vee P_4)$ concept under three different error rates, 5%, 10%, and 15%. (A five percent error rate means that one out of 20 samples is mislabeled.)

FIG. 10: The Effect of Different $\alpha$'s

FIG. 11: Precision/Recall Under 0%, 5%, 10%, and 15% Noise

We also used two different $\gamma$ settings (one and two) to examine the trade off between learning speed and accuracy. FIG. 11 presents the precision/recall after two or three user iterations under different error rates. MEGA enjoys little to no performance degradation when the noise rates are less than or equal to 10%. When the error rate is 15%, MEGA's search accuracy starts to deteriorate. This experiment shows that MEGA is able to tolerate mild user errors.

Next, we fix recall at 50% and examine how different error rates and $\gamma$ settings affect learning precision. FIG. 12(*a*) shows that under both $\gamma$=1 and $\gamma$=2 settings, MEGA reaches high precision. However, MEGA's precision improves much faster when $\gamma$=1 than when $\gamma$=2. This result does not surprise us, since a lower $\gamma$ value eliminates terms more aggressively and hence leads to faster convergence. When the noise level is high (15%), FIG. 12(*b*) shows that a low $\gamma$ setting hinders accurate learning of the target concept. This is because MEGA eliminates terms too aggressively, and the high noise level causes it to eliminate wrong terms. But if we set $\gamma$=2, we can learn the concept with higher accuracy by slowing down the learning pace. This experiment shows a clear trade off between learning accuracy and convergence speed. When the noise level is low, it is preferable to use a less strict voting scheme (i.e., setting a smaller $\gamma$) for achieving faster convergence. When the noise level is high, a Stricter voting scheme (i.e., using a larger $\gamma$) will better maintain high accuracy.

8.5.3 Observations

We can summarize the above experimental results as follows:

1. Convergence speed: MEGA converges much faster than the other schemes in all cases.

FIG. 12: Effects of Noise

2. Model accuracy: MEGA outperforms the other schemes by a wide margin when the target query concept is in k-CNF. Even when a user's query concept is a weighted linear function, MEGA can approximate it fairly well. The fact that MEGA can achieve a high convergence ratio in a small number of iterations makes it an attractive on-line learning scheme.

3. Noise tolerance: MEGA does well under noise conditions, including model bias and user errors.

8.6 MEGA Applied to An Image Dataset

We also conducted experiments on a 1,500-image dataset [1]. A 144-dimension feature vector was extracted for each image containing information about color histograms, color moments, textures, etc. [2]. We divided features into nine sets based on their resolutions (depicted in Table 5). We assumed that query concepts could be modeled in 3-CNF. Each of the query concepts we tested belongs to one of the 10 image categories: architecture, bears, clouds, flowers, landscape, and people, objectionable images, tigers, tools, and waves. MEGA learned a target concept solely in the feature space and had no knowledge about these categories.

In each experiment, we began with a set of 20 randomly generated images for querying user feedback. After each iteration, we evaluated the performance by retrieving top-K images based on the concept we had learned. We recorded the ratio of these images that satisfied the user's concept. We ran each experiment through up to five rounds of relevance feedback, since we deemed it unrealistic to expect an interactive user to conduct too many rounds of feedback. We ran each experiment 10 times with different initial starting samples.

Table 6 shows the precision of the 10 query concepts-for K=10 or 20. (Recall is not presented in this case because it is irrelevant.) For each of the queries, after three iterations, the results were satisfactory concerning the quality of the top-10 retrieval. For top-20 retrieval, it required only one more iteration to surpass 86% precision. Finally, FIG. 13 shows the average precision of the top-10 and top-20 retrieval of all queries with respect to the number of iterations.

TABLE 5

Multi-resolution Image Features.

| Feature Group # | Filter Name | Resolution | Representation |
|---|---|---|---|
| 1 | Color Masks | Coarse | Number of identical culture colors |
| 2 | Color Histograms | Medium | Distribution of colors |
| 3 | Color Average | Medium | Similarity comparison within the same culture color |
| 4 | Color Variance | Fine | Similarity comparison within the same culture color |
| 5 | Spread | Coarse | Spatial concentration of a color |
| 6 | Elongation | Coarse | Shape of a color |
| 7 | Vertical Wavelets Level 1 | Coarse | Vertical frequency components |
| | Horizontal Wavelets Level 1 | | Horizontal frequency components |
| | Diagonal Wavelets Level 1 | | Diagonal frequency components |
| 8 | Vertical Wavelets Level 2 | Medium | Vertical frequency components |
| | Horizontal Wavelets Level 2 | | Horizontal frequency components |
| | Diagonal Wavelets Level 2 | | Diagonal frequency components |
| 9 | Vertical Wavelets Level 3 | Fine | Vertical frequency components |
| | Horizontal Wavelets Level 3 | | Horizontal frequency components |
| | Diagonal Wavelets Level 3 | | Diagonal frequency components |

FIG. 13: Average Precision of Top-10 and Top-20 Queries

9 Related Work

The existing work in query-concept learning suffers in at least one of the following three areas: sample selection, feature reduction, and query-concept modeling.

In most inductive learning problems studied in the AI community, samples are assumed to be taken randomly in such a way that various statistical properties can be derived conveniently. However, for interactive applications where the number of samples must be small (or impatient users might be turned away), random sampling is not suitable.

TABLE 6

Experimental Results on Image Dataset.

| | Iteration 1 | | Iteration 2 | | Iteration 3 | | Iteration 4 | | Iteration 5 | |
|---|---|---|---|---|---|---|---|---|---|---|
| Categories | Top 10 | Top 20 | Top 10 | Top 20 | Top 10 | Top 20 | Top 10 | Top 20 | Top 10 | Top 20 |
| Architecture | 0.800 | 0.710 | 0.950 | 0.865 | 1.000 | 0.950 | 1.000 | 0.970 | 0.910 | 0.920 |
| Bears | 0.030 | 0.065 | 0.380 | 0.220 | 0.760 | 0.490 | 0.860 | 0.740 | 0.910 | 0.690 |
| Clouds | 0.260 | 0.180 | 0.420 | 0.295 | 0.780 | 0.580 | 0.910 | 0.720 | 0.980 | 0.895 |
| Flowers | 0.670 | 0.445 | 0.750 | 0.715 | 0.990 | 0.855 | 1.000 | 0.950 | 1.000 | 0.950 |
| Landscape | 0.370 | 0.260 | 0.580 | 0.430 | 0.850 | 0.575 | 0.950 | 0.795 | 0.880 | 0.900 |
| Objectionable | 0.760 | 0.670 | 0.890 | 0.815 | 1.000 | 0.900 | 0.990 | 0.955 | 0.970 | 0.950 |
| People | 0.340 | 0.250 | 0.660 | 0.550 | 0.810 | 0.635 | 1.000 | 0.815 | 0.990 | 0.840 |
| Tigers | 0.440 | 0.375 | 0.580 | 0.410 | 1.000 | 0.880 | 1.000 | 0.930 | 1.000 | 0.980 |
| Tools | 0.420 | 0.350 | 1.000 | 0.980 | 1.000 | 1.000 | 1.000 | 1.000 | 1.000 | 1.000 |
| Waves | 0.480 | 0.425 | 0.960 | 0.585 | 0.810 | 0.730 | 0.930 | 0.800 | 0.990 | 0.845 |
| Average | 0.457 | 0.373 | 0.717 | 0.587 | 0.900 | 0.760 | 0.964 | 0.868 | 0.963 | 0.897 |

Relevance feedback techniques proposed by the IR (Information Retrieval) and database communities do perform non-random sampling. The study of [16] puts these query refinement approaches into three categories: query reweighting, query point movement, and query expansion.

Query reweighting and query point movement [7, 14, 15]. Both query reweighting and query point movement use nearest-neighbor sampling: They return top ranked objects to be marked by the user and refine the query based on the feedback. If the initial query example is good, this nearest-neighbor sampling approach works fine. However, most users may not have a good example to start a query. Refining around bad examples is analogous to trying to find oranges in the middle of an apple orchard by refining one's search to a few rows of apple trees at a time. It will take a long time to find oranges (the desired result). In addition, theoretical studies show that for the nearest neighbor approach, the number of samples needed to reach a given accuracy grows exponentially with the number of irrelevant features [10, 11], even for conjunctive concepts.

Query expansion [16, 201]. The query expansion approach can be regarded as a multiple-instances sampling approach. The samples of the next round are selected from the neighborhood (not necessarily the nearest ones) of the positive-labeled instances of the previous round. The study of [16] shows that query expansion achieves only a slim margin of improvement (about 10% in precision/recall) over query point movement. Again, the presence of irrelevant features can make this approach perform poorly.

To reduce learning samples, active learning or pool-based learning has been introduced for choosing good samples from the unlabeled data pool. The Query by Committee (QBC) algorithm [6], uses a distribution over the hypothesis space (i.e., a distribution over all possible classifiers) and then chooses a sample to query an oracle (a user) to reduce entropy of the posterior distribution over the hypothesis space by the largest amount. QBC reduces the number of samples needed for learning a classifier, but it does not tackle the irrelevant feature problem. MEGA may be regarded as a variant of the QBC algorithm with an additional embedded[1] feature reduction step. MEGA provides an effective method for refining committee members (i.e., a k-CNF and a k-DNF hypothesis), and at the same time, delimits the boundary of the sampling space for efficiently finding useful samples to further refine the committee members and the sampling boundary.

For query-concept learning, feature reduction must be embedded in the learning algorithm and cannot be a preprocessing step, since a concept-learner may not know what a query concept is beforehand.

For image retrieval, the PicHunter system [3] uses Bayes' rule to predict the goal image, based upon the users'0 actions. The system shows that employing active learning can drastically cut down the number of iterations (up to 80% in some experiments). But, the authors also point out that their scheme is computationally intensive, since it recomputes conditional probability for all unlabeled samples after each round of user feedback and hence may not scale well with dataset size.

Finally, much traditional work suffers from model bias. Some systems (e.g., [4, 5]) assume that the overall similarity can be expressed as a weighted linear combination of similarities in features. Similarly, some systems assume that query concepts are disjunctive [20]. When a query concept does not fit the model assumption, these systems perform poorly. MEGA works well with model bias and moderately noisy feedback.

While particular embodiments of the invention have been disclosed in detail, various modifications to the preferred embodiments can be made without departing from the spirit and scope of the invention. Thus, the invention is limited only by the appended claims.

What is claimed is:

1. A method of learning a user query concept for searching visual images encoded in computer readable storage media comprising:

providing a multiplicity of respective sample images encoded in a computer readable medium;

providing a multiplicity of respective sample expressions encoded in computer readable medium that respectively correspond to respective sample images and in which respective terms of such respective sample expressions represent respective features of corresponding sample images;

defining a user query concept sample space bounded by a k-CNF expression which models a query concept and by a k-DNF expression;

refining the user query concept sample space by, selecting multiple respective sample images from within the user query concept sample space by selecting respective sample expressions that correspond to such images, wherein respective sample expressions are selected by optimizing a tradeoff between a respective expression's having sufficient similarity to the k-CNF expression that a user is likely to indicate that its corresponding sample image is close to the user's query concept and such respective expression's having sufficient dissimilarity from the k-CNF expression that an indication by the user that its corresponding sample image is close to the user's query concept is likely to provide maximum information as to which disjunctive terms of the k-CNF expression do not match the user's query concept;

presenting the multiple selected sample images to the user;

soliciting user feedback as to which of the multiple presented sample images are close to the user's query concept;

wherein refining the user query concept sample space further includes, refining the k-CNF expression by, identifying respective differences between one or more respective terms of respective sample expressions, corresponding to respective sample images indicated by a user as close to the user's query concept, and corresponding respective disjunctive terms of the k-CNF expression;

determining which, if any, respective disjunctive terms of the k-CNF expression to remove from the k-CNF expression based upon the identified differences;

removing from the k-CNF expression respective disjunctive terms determined to be removed;

wherein refining the user query concept sample space further includes, refining the k-DNF expression by, identifying respective differences between one or more respective terms of respective sample expressions, corresponding to respective sample images indicated by a user as not close to the user's query concept, and corresponding respective conjunctive terms of the k-DNF expression;

determining which, if any, respective conjunctive terms of the k-DNF to remove from the k-DNF expression based upon the identified differences; and removing from the k-DNF expression respective conjunctive terms determined to be removed.

2. The method of claim 1 further including:

removing respective sample images presented to the user from eligibility for presentation to that same user.

3. The method of claim 1 further including:

repeating the steps involved in refining the user query concept sample space.

4. The method of claim 1 further including:

repeating the steps involved in refining the user query concept sample space until the k-DNF expression becomes identical to or more specific than the k-CNF expression.

5. The method of claim 1 further including:

repeating the steps involved in refining the user query concept sample space until the user ends search.

6. The method of claim 1 further including:

dividing the k-CNF into multiple sub-group k-CNF expressions by separating respective disjunctive terms that can express each other's feature information into different sub-group k-CNF expressions such that such separation of disjunctive terms does not result in loss of combinations of feature information due to such dividing;

wherein identifying respective differences between respective terms of one or more sample expressions and corresponding respective disjunctive terms of the k-CNF expression involves identifying respective differences between respective terms of one or more sample expressions, corresponding to respective sample images indicated by a user as close to the user's query concept, and corresponding respective disjunctive terms of respective sub-group k-CNF expressions; and wherein removing from the k-CNF expression respective disjunctive terms involves removing from respective sub-group k-CNF expressions respective disjunctive terms based on respective identified differences.

7. The method of claim 1 further including:

dividing the k-CNF into multiple sub-group k-CNF expressions by separating respective disjunctive terms that can express each other's feature information into different sub-group k-CNF expressions such that such separation of disjunctive terms does not result in loss of combinations of feature information due to such dividing;

wherein identifying respective differences between respective terms of one or more sample expressions and corresponding respective disjunctive terms of the k-CNF expression involves identifying respective differences between respective terms of one or more sample expressions, corresponding to respective sample images indicated by a user as close to the user's query concept, and corresponding respective disjunctive terms of respective sub-group k-CNF expressions; and wherein removing from the k-CNF expression respective disjunctive terms involves removing from respective sub-group k-CNF expressions respective disjunctive terms based on respective identified differences;

dividing the k-DNF expression into multiple sub-group k-DNF expressions by separating respective conjunctive terms that can express each other's feature information into different sub-group k-DNF expressions such that such separation of conjunctive terms does not result in loss of combinations of feature information due to such dividing;

wherein identifying respective differences between respective terms of one or more sample expressions and corresponding respective conjunctive terms of the k-DNF expression involves identifying respective differences between respective terms of one or more sample expressions, corresponding to respective sample images indicated by a user as not close to the user's query concept, and corresponding respective conjunctive terms of respective sub-group k-DNF expressions; and wherein removing from the k-DNF expression respective conjunctive terms involves removing from respective sub-group k-DNF expressions respective conjunctive terms based on respective identified differences.

8. The method of claim 1, wherein identifying respective differences between respective terms of one or more sample expressions and corresponding respective disjunctive terms of the k-CNF expression includes, testing respective sample expression terms for respective levels of difference from corresponding respective disjunctive terms of the k-CNF expression in a prescribed order such that, for a respective given feature, a respective term representing higher resolution of such given respective feature is tested before a respective term representing a lower resolution of such given respective feature; and not testing such respective term representing the lower resolution of such given respective feature if the testing of the respective term representing the higher resolution of such given respective feature indicates that there is a level of difference larger than a prescribed level between such respective expression term representing the higher resolution and the respective corresponding disjunctive term of the k-CNF expression representing the higher resolution of such given respective feature.

9. The method of claim 1, wherein identifying respective differences between respective terms of one or more sample expressions and corresponding respective disjunctive terms of the k-CNF expression includes, testing respective sample expression terms for respective levels of difference from corresponding respective disjunctive terms of the k-CNF expression in a prescribed order such that, for a respective given feature, a respective term representing higher resolution of such given respective feature is tested before a respective term representing a lower resolution of such given respective feature; and not testing such respective term representing the lower resolution of such given respective feature if the testing of the respective term representing the higher resolution of such given respective feature indicates that there is a level of difference that is larger than a prescribed level between such respective expression term representing the higher resolution and the respective corresponding disjunctive term of the k-CNF expression representing the higher resolution of such given respective feature; and wherein identifying respective differences between respective terms of one or more sample expressions and corresponding respective conjunctive terms of the k-DNF expression includes, testing respective sample expression terms for respective levels of difference from corresponding respective conjunctive terms of the k-DNF expression in a prescribed order such that, for a respective given feature, a respective term representing higher resolution of such given respective feature is tested before a respective term representing a lower resolution of such given respective feature; and not testing such respective term representing the lower resolution of such given respective feature if the testing of the respective term representing the higher resolution of such given respective feature indicates that there is a level of difference that is smaller than a prescribed level between such respective expression term representing the higher resolution and the respective corresponding conjunctive term of the k-DNF expression representing the higher resolution of such given respective feature.

10. The method of claim 1, wherein identifying respective differences between respective terms of one or more sample expressions and corresponding respective disjunctive terms of the k-CNF includes, measuring respective differences between respective values of respective disjunctive terms of the k-CNF expression and respective values of corresponding respective terms of sample expressions for respective sample images indicated by a user as close to the user's query concept; and removing from the k-CNF respective disjunctive terms for which there are more than a prescribed threshold number of sample expressions for which corresponding respective measured value differences are greater than a prescribed threshold value difference.

11. The method of claim 1, wherein identifying respective differences between terms predicates of one or more sample expressions and corresponding respective disjunctive terms of the k-CNF includes, measuring respective differences between respective values of respective disjunctive terms of the k-CNF expression and respective values of corresponding respective terms of sample expressions for respective sample images indicated by a user as close to the user's query concept; and removing from the k-CNF respective disjunctive terms for which there are more than a prescribed threshold number of sample expressions for which corresponding respective measured value differences are greater than a prescribed threshold value difference; and wherein identifying respective differences between respective terms of one or more sample expressions and corresponding respective conjunctive terms of the k-DNF includes, measuring respective differences between respective values of respective conjunctive terms of the k-DNF expression and respective values of corresponding respective terms of sample expressions for respective sample images indicated by a user as not close to the user's query concept; and removing from the k-DNF respective conjunctive terms for which there are more than a prescribed threshold number of sample expressions for which corresponding respective measured value differences are less than a prescribed threshold value difference.

12. The method of claim 1, wherein selecting multiple sample images from the user query concept sample space includes, selecting respective sample images that correspond to respective sample expressions for which $\psi$ terms in respective corresponding sample expressions contradict the k-CNF expression;

wherein, $\psi=1/\ln(1/1-p)$, and wherein p represents a probability that a given disjunctive term of the k-CNF expression will be removed from the k-CNF expression in the step of removing from the k-CNF expression respective disjunctive terms.

13. The method of claim 1, wherein selecting multiple sample images from the user query concept sample space includes, selecting respective sample images that correspond to respective sample expressions that have a prescribed number of respective terms that contradict corresponding respective terms of the k-CNF expression;

wherein the prescribed number is determined empirically by balancing a need for a prescribed number that is small enough that the selected sample images are likely to be indicated by the user as being close to the user's query concept with a need for a prescribed number that is large enough that the there is likely to be at least one set of multiple respective sample images that correspond to a set of multiple respective sample expressions that contradict the k-CNF expression in the same term.

14. The method of claim 1, wherein defining the user query concept sample space includes, selecting an initial set of sample images by choosing at least one sample image from each of multiple preclustered sets of sample images.

15. The method of claim 1, wherein selecting multiple sample images from within the user query concept sample space includes, respectively selecting images that correspond to respective sample expressions that have a prescribed number of respective terms that contradict corresponding respective terms of the k-CNF expression;

wherein identifying respective differences between respective terms of one or more sample expressions and corresponding respective disjunctive terms of the k-CNF expression includes, determining which respective terms of the k-CNF expression contradict corresponding respective terms of more than a prescribed number of sample expressions; and wherein removing from the k-CNF expression respective disjunctive terms includes, removing from the k-CNF expression respective disjunctive terms that contradict corresponding respective terms of more than the prescribed number of sample expressions indicated by a user as close to the user's query concept.

16. The method of claim 1, wherein selecting multiple sample images from within the user query concept sample space includes, respectively selecting images that correspond to respective sample expressions that have a prescribed number of respective terms that contradict corresponding respective terms of the k-CNF expression;

wherein identifying respective differences between respective terms of one or more sample expressions and corresponding respective disjunctive terms of the k-CNF expression includes, determining which respective terms of the k-CNF expression contradict corresponding respective terms of more than a prescribed number of sample expressions indicated by a user as close to the user's query concept; and wherein removing from the k-CNF expression respective disjunctive terms includes, removing from the k-CNF expression respective disjunctive terms that contradict corresponding respective terms of more than the prescribed number of sample expressions indicated by the user as close to the user's query concept; and wherein identifying respective differences between respective terms of one or more sample expressions and corresponding respective conjunctive predicates of the k-DNF expression includes, determining which respective terms of the k-DNF expression do not contradict corresponding respective terms of more than a prescribed number of sample expressions indicated by the user as not close to the user's query concept; and wherein removing from the k-DNF expression respective conjunctive terms includes, removing from the k-DNF expression respective conjunctive terms that do not contradict corresponding respective terms of more than the prescribed number of sample expressions indicated by a user as not close to the user's query concept.

17. The method of claim 1, wherein identifying respective differences between respective terms of each one or more sample expressions and corresponding respective disjunctive terms of the k-CNF expression involves, measuring respective levels of difference between respective terms of one or more sample expressions, corresponding to respective sample images indicated by a user as close to the user's query concept, and corresponding respective disjunctive terms of the k-CNF expression;

wherein determining which, if any, respective disjunctive terms to remove from the k-CNF expression involves identifying which, if any, k-CNF disjunctive terms have measured levels of difference from corresponding expression terms of one or more images, that meet a prescribed threshold for disjunctive term removal;

wherein removing from the k-CNF expression respective disjunctive terms determined to be removed involves removing respective disjunctive terms with measured levels of difference that meet the prescribed threshold for disjunctive term removal;

wherein identifying respective differences between respective terms of each one or more sample expressions and corresponding respective conjunctive terms of the k-DNF expression involves, measuring respective levels of difference between respective terms of one or more sample expressions, corresponding to respective sample images indicated by a user as not close to the user's query concept, and corresponding respective conjunctive terms of the k-DNF expression;

wherein determining which, if any, respective conjunctive terms to remove from the k-DNF expression involves identifying which, if any, k-DNF conjunctive terms have measured levels of difference from corresponding expression terms of one or more images, that meet a prescribed threshold for removal of conjunctive terms; and wherein removing from the k-DNF expression respective conjunctive terms determined to be removed involves removing respective conjunctive terms with measured levels of difference that meet the prescribed threshold for conjunctive term removal.

18. The method of claim 1, wherein determining which, if any, disjunctive terms of the k-CNF expression to remove from the k-CNF expression based upon the identified differences involves, determining which, if any, k-CNF disjunctive terms and corresponding terms of one or more images differ by at least a prescribed amount; and wherein determining which, if any, respective conjunctive terms of the k-DNF expression to remove from the k-DNF expression based upon the identified differences involves, determining which, if any, k-DNF conjunctive terms and corresponding terms of one or more images differ by no more than a prescribed amount.

19. The method of claim 1, wherein each disjunctive term comprises one or more predicates; and wherein each conjunctive term comprises one or more predicates.

20. The method of claim 1, wherein each disjunctive term comprises one or more predicates;

wherein each conjunctive term comprises one or more predicates; and wherein each respective predicate corresponds to a respective image feature.

21. The method of claim 1, wherein each respective predicate corresponds to a respective image feature.

22. A method of learning user query concept for searching visual images encoded in computer readable storage media comprising:

providing a multiplicity of respective sample images encoded in a computer readable medium;

providing a multiplicity of respective sample expressions encoded in computer readable medium that respectively correspond to respective sample images and in which respective terms of such respective sample expressions represent respective features of corresponding sample images;

defining a user query concept sample space by initially designating an initial set of sample images with at least one sample image from each of multiple pre-clustered sets of sample images as an initial user query concept sample space and by defining a k-CNF expression and a k-DNF expression which, together, encompass an initial set of sample expressions that correspond respectively to the sample images of the initial set of sample images; wherein the k-CNF expression designates a more specific concept within the user query concept sample space; and wherein the k-DNF expression designates a more general concept within the user query concept sample space;

refining the user query concept sample space by, selecting multiple sample images from within the user query concept sample space that correspond to respective sample expressions that have a prescribed number of respective terms that contradict corresponding respective terms of the k-CNF expression;

resenting the multiple selected sample images to the user;

soliciting user feedback as to which of the multiple presented sample images are close to the user's query concept;

wherein refining the user query concept sample space further includes, refining the k-CNF expression by, identifying respective terms of respective sample expressions that contradict corresponding respective disjunctive terms of the k-CNF expression for those respective sample expressions corresponding to respective sample images indicated by the user as close to the user's query concept;

determining which, if any, respective disjunctive terms of the k-CNF expression identified as contradicting corresponding respective terms of sample expressions indicated by the user as close to the user's query concept, contradict corresponding respective terms of more than a prescribed number of such sample expressions;

removing from the k-CNF expression respective disjunctive terms that contradict corresponding respective terms of more than the prescribed number of sample expressions;

wherein refining the user query concept sample space further includes, refining the k-DNF expression by, identifying respective terms of respective sample expressions that do not contradict corresponding respective conjunctive terms of the k-DNF expression for those respective sample expressions corresponding to respective sample images indicated by the user as not close to the user's query concept;

determining which, if any, respective conjunctive terms of the k-DNF expression identified as not contradicting corresponding respective terms of sample expressions indicated by the user as not close to the user's query concept, do not contradict corresponding respective terms of more than a prescribed number of such sample expressions;

removing from the k-DNF expression respective conjunctive terms that do not contradict corresponding respective predicates of more than the prescribed number of sample expressions; and repeating the steps involved in refining the user query concept sample space.

23. The method of claim 22 wherein repeating the steps involved in refining the user query concept sample space involves repeating until the user ends the search.

24. The method of claim 22 further including repeating the steps involved in refining the user query concept sample space until the k-DNF expression becomes identical to or more specific than the k-CNF expression.

* * * * *